US008117552B2

(12) United States Patent (10) Patent No.: US 8,117,552 B2
Paoli et al. (45) Date of Patent: Feb. 14, 2012

(54) INCREMENTALLY DESIGNING ELECTRONIC FORMS AND HIERARCHICAL SCHEMAS

(75) Inventors: Jean D. Paoli, Kirkland, WA (US); Laurent Mollicone, Kirkland, WA (US); Ned B. Friend, Seattle, WA (US); Matthew J. Kotler, Kenmore, WA (US); Thomas R. Lawrence, Seattle, WA (US); Shuk-Yan Lai, Redmond, WA (US); Sharma K. Hendel, Seattle, WA (US); Jason Whitmarsh, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 877 days.

(21) Appl. No.: 11/567,140

(22) Filed: Dec. 5, 2006

(65) Prior Publication Data

US 2007/0094589 A1 Apr. 26, 2007

Related U.S. Application Data

(62) Division of application No. 10/395,505, filed on Mar. 24, 2003, now Pat. No. 7,275,216.

(51) Int. Cl.
*G06F 3/00* (2006.01)
*G09G 5/00* (2006.01)
(52) U.S. Cl. ....................................... 715/763; 715/780
(58) Field of Classification Search .......... 715/762–763, 715/780, 853–855, 810, 771–773, 866, 744–747, 715/707; 717/125, 109; 707/101–102; 709/219
See application file for complete search history.

(56) References Cited

U.S. PATENT DOCUMENTS

| 2,804,878 A | 9/1957 | Fishwood et al. |
| 3,091,077 A | 5/1963 | Erickson et al. |
| 3,104,520 A | 9/1963 | Cazier et al. |
| 3,195,805 A | 7/1965 | Cholvin et al. |
| 3,196,606 A | 7/1965 | Cholvin et al. |
| 3,812,942 A | 5/1974 | Espenschied et al. |
| 3,874,828 A | 4/1975 | Herschler et al. |
| 3,961,748 A | 6/1976 | McNabney |
| 4,005,578 A | 2/1977 | McInerney |
| 4,005,579 A | 2/1977 | Lloyd |
| 4,060,340 A | 11/1977 | Yanik et al. |
| 4,089,623 A | 5/1978 | Hofmann, Jr. |
| 4,201,978 A | 5/1980 | Nally |
| 4,256,019 A | 3/1981 | Braddick |
| 4,362,475 A | 12/1982 | Seitz |
| 4,391,184 A | 7/1983 | Yumane et al. |

(Continued)

FOREIGN PATENT DOCUMENTS

AU 2006200285 1/2011

(Continued)

OTHER PUBLICATIONS

"Final Office Action", U.S. Appl. No. 11/036,910, (May 26, 2010), 9 pages.

(Continued)

*Primary Examiner* — Steven Sax

(57) ABSTRACT

A system and method that enables a designer to build electronic forms and corresponding hierarchical schemas are described. Displays of hierarchical schemas, electronic forms, and components used to build the hierarchical schemas and electronic forms are provided to the designer. The designer selects components and arranges them on a display to visually build an electronic form. As the form is built, the corresponding hierarchical schema is incrementally updated to reflect changes made to the electronic form.

11 Claims, 13 Drawing Sheets

U.S. PATENT DOCUMENTS

| | | | |
|---|---|---|---|
| 4,396,345 A | 8/1983 | Hutchinson | |
| 4,514,985 A | 5/1985 | Cadeddu | |
| 4,564,752 A | 1/1986 | Lepic et al. | |
| 4,783,648 A | 11/1988 | Homma et al. | |
| 4,847,749 A | 7/1989 | Collins et al. | |
| 4,975,690 A | 12/1990 | Torres | |
| 5,025,484 A | 6/1991 | Yamanari et al. | |
| 5,140,563 A | 8/1992 | Thinesen | |
| 5,218,672 A | 6/1993 | Morgan et al. | |
| 5,220,649 A | 6/1993 | Forcier | |
| 5,222,160 A | 6/1993 | Sakai et al. | |
| 5,228,100 A | 7/1993 | Takeda et al. | |
| 5,257,646 A | 11/1993 | Meyer | |
| 5,388,967 A | 2/1995 | Firnhaber et al. | |
| 5,388,968 A | 2/1995 | Wood et al. | |
| 5,428,738 A * | 6/1995 | Carter et al. | 715/804 |
| 5,455,875 A | 10/1995 | Chevion et al. | |
| 5,456,582 A | 10/1995 | Firnhaber et al. | |
| 5,463,726 A | 10/1995 | Price | |
| 5,537,596 A | 7/1996 | Yu et al. | |
| 5,540,558 A | 7/1996 | Harden et al. | |
| 5,555,325 A | 9/1996 | Burger | |
| 5,556,271 A | 9/1996 | Zuercher et al. | |
| 5,566,330 A | 10/1996 | Sheffield | |
| 5,600,789 A | 2/1997 | Parker et al. | |
| 5,613,837 A | 3/1997 | Konishi et al. | |
| 5,630,126 A | 5/1997 | Redpath | |
| 5,630,706 A | 5/1997 | Yang | |
| 5,634,113 A * | 5/1997 | Rusterholz | 716/13 |
| 5,634,124 A | 5/1997 | Khoyi et al. | |
| 5,655,887 A | 8/1997 | Chou | |
| 5,664,938 A | 9/1997 | Yang | |
| 5,681,151 A | 10/1997 | Wood | |
| 5,689,667 A | 11/1997 | Kurtenbach | |
| 5,692,540 A | 12/1997 | Huang | |
| 5,720,016 A | 2/1998 | Egashira | |
| 5,734,380 A | 3/1998 | Adams et al. | |
| 5,742,795 A | 4/1998 | Kussel | |
| 5,748,807 A | 5/1998 | Lopresti et al. | |
| 5,785,081 A | 7/1998 | Krawczyk et al. | |
| 5,787,274 A | 7/1998 | Agrawal et al. | |
| 5,796,403 A | 8/1998 | Adams et al. | |
| 5,799,311 A | 8/1998 | Agrawal et al. | |
| 5,801,702 A | 9/1998 | Dolan et al. | |
| 5,803,715 A | 9/1998 | Kitchener | |
| 5,805,824 A | 9/1998 | Kappe | |
| 5,825,359 A | 10/1998 | Derby et al. | |
| 5,826,031 A | 10/1998 | Nielsen | |
| 5,835,777 A | 11/1998 | Staelin | |
| 5,845,090 A | 12/1998 | Collins, III et al. | |
| 5,845,122 A | 12/1998 | Nielsen et al. | |
| 5,859,973 A | 1/1999 | Carpenter et al. | |
| 5,862,379 A | 1/1999 | Rubin et al. | |
| 5,870,735 A | 2/1999 | Agrawal et al. | |
| 5,873,088 A | 2/1999 | Hayashi et al. | |
| 5,875,815 A | 3/1999 | Ungerecht et al. | |
| 5,907,621 A | 5/1999 | Bachman et al. | |
| 5,919,247 A | 7/1999 | Van Hoff et al. | |
| 5,928,363 A | 7/1999 | Ruvolo | |
| 5,929,858 A | 7/1999 | Shibata et al. | |
| RE36,281 E | 8/1999 | Zuercher et al. | |
| 5,947,711 A | 9/1999 | Myers et al. | |
| 5,950,010 A | 9/1999 | Hesse et al. | |
| 5,950,221 A | 9/1999 | Draves et al. | |
| 5,953,731 A | 9/1999 | Glaser | |
| 5,956,481 A | 9/1999 | Walsh et al. | |
| 5,963,208 A | 10/1999 | Dolan et al. | |
| 5,973,696 A | 10/1999 | Agranat et al. | |
| 5,983,348 A | 11/1999 | Ji | |
| 5,991,731 A | 11/1999 | Colon et al. | |
| 6,005,570 A | 12/1999 | Gayraud et al. | |
| 6,006,227 A | 12/1999 | Freeman et al. | |
| 6,006,241 A | 12/1999 | Purnaveja et al. | |
| 6,012,066 A | 1/2000 | Discount et al. | |
| 6,035,297 A | 3/2000 | Van Huben et al. | |
| 6,057,837 A | 5/2000 | Hatakeda et al. | |
| 6,058,413 A | 5/2000 | Flores et al. | |
| 6,070,184 A | 5/2000 | Blount et al. | |
| 6,088,679 A | 7/2000 | Barkley | |
| 6,097,382 A | 8/2000 | Rosen et al. | |
| 6,106,570 A | 8/2000 | Mizuhara | |
| 6,121,965 A | 9/2000 | Kenney et al. | |
| 6,144,969 A | 11/2000 | Inokuchi et al. | |
| 6,178,551 B1 | 1/2001 | Sana et al. | |
| 6,182,094 B1 | 1/2001 | Humpleman et al. | |
| 6,192,367 B1 | 2/2001 | Hawley et al. | |
| 6,199,204 B1 | 3/2001 | Donohue | |
| 6,209,128 B1 | 3/2001 | Gerard et al. | |
| 6,219,423 B1 | 4/2001 | Davis | |
| 6,247,016 B1 | 6/2001 | Rastogi et al. | |
| 6,272,506 B1 | 8/2001 | Bell | |
| 6,279,042 B1 | 8/2001 | Ouchi | |
| 6,286,130 B1 | 9/2001 | Poulsen et al. | |
| 6,308,273 B1 | 10/2001 | Goertzel et al. | |
| 6,311,221 B1 | 10/2001 | Raz et al. | |
| 6,314,415 B1 | 11/2001 | Mukherjee | |
| 6,321,259 B1 * | 11/2001 | Ouellette et al. | 709/220 |
| 6,331,864 B1 * | 12/2001 | Coco et al. | 715/763 |
| 6,336,214 B1 | 1/2002 | Sundaresan | |
| 6,336,797 B1 | 1/2002 | Kazakis et al. | |
| 6,343,149 B1 | 1/2002 | Motoiwa | |
| 6,351,574 B1 | 2/2002 | Yair et al. | |
| 6,353,851 B1 | 3/2002 | Anupam et al. | |
| 6,385,767 B1 | 5/2002 | Ziebell | |
| 6,393,469 B1 | 5/2002 | Dozier et al. | |
| 6,401,077 B1 | 6/2002 | Godden et al. | |
| 6,405,221 B1 | 6/2002 | Levine et al. | |
| 6,405,238 B1 | 6/2002 | Votipka | |
| 6,414,700 B1 | 7/2002 | Kurtenbach et al. | |
| 6,427,142 B1 * | 7/2002 | Zachary et al. | 706/49 |
| 6,429,885 B1 * | 8/2002 | Saib et al. | 715/854 |
| 6,434,743 B1 | 8/2002 | Click et al. | |
| 6,460,058 B2 | 10/2002 | Koppolu et al. | |
| 6,476,828 B1 * | 11/2002 | Burkett et al. | 715/760 |
| 6,493,006 B1 | 12/2002 | Gourdol et al. | |
| 6,493,007 B1 | 12/2002 | Pang | |
| 6,501,864 B1 | 12/2002 | Eguchi et al. | |
| 6,505,200 B1 | 1/2003 | Ims et al. | |
| 6,505,300 B2 | 1/2003 | Chen et al. | |
| 6,505,344 B1 | 1/2003 | Blais et al. | |
| 6,513,154 B1 | 1/2003 | Porterfield | |
| 6,535,229 B1 | 3/2003 | Kraft | |
| 6,535,883 B1 | 3/2003 | Lee et al. | |
| 6,539,464 B1 | 3/2003 | Getov | |
| 6,549,922 B1 | 4/2003 | Srivastava et al. | |
| 6,560,616 B1 | 5/2003 | Garber | |
| 6,574,655 B1 | 6/2003 | Libert et al. | |
| 6,584,469 B1 | 6/2003 | Chiang et al. | |
| 6,594,686 B1 | 7/2003 | Edwards et al. | |
| 6,604,238 B1 | 8/2003 | Lim et al. | |
| 6,611,812 B2 | 8/2003 | Hurtado et al. | |
| 6,611,843 B1 | 8/2003 | Jacobs | |
| 6,613,098 B1 | 9/2003 | Sorge et al. | |
| 6,625,622 B1 | 9/2003 | Henrickson et al. | |
| 6,629,109 B1 | 9/2003 | Koshisaka | |
| 6,640,249 B1 | 10/2003 | Bowman-Amuah | |
| 6,654,737 B1 | 11/2003 | Nunez | |
| 6,658,417 B1 | 12/2003 | Stakutis et al. | |
| 6,658,652 B1 | 12/2003 | Alexander et al. | |
| 6,661,920 B1 | 12/2003 | Skinner | |
| 6,671,805 B1 | 12/2003 | Brown et al. | |
| 6,678,625 B1 | 1/2004 | Reise et al. | |
| 6,681,370 B2 | 1/2004 | Gounares et al. | |
| 6,710,789 B1 | 3/2004 | Sekiguchi et al. | |
| 6,728,755 B1 | 4/2004 | de Ment | |
| 6,738,783 B2 | 5/2004 | Melli et al. | |
| 6,745,367 B1 | 6/2004 | Bates et al. | |
| 6,748,569 B1 | 6/2004 | Brooke et al. | |
| 6,757,826 B1 | 6/2004 | Paltenghe | |
| 6,757,890 B1 | 6/2004 | Wallman | |
| 6,760,723 B2 | 7/2004 | Oshinsky et al. | |
| 6,766,526 B1 | 7/2004 | Ellis | |
| 6,772,139 B1 | 8/2004 | Smith, III | |
| 6,782,144 B2 | 8/2004 | Bellavita et al. | |
| 6,806,892 B1 | 10/2004 | Plow et al. | |
| 6,823,478 B1 | 11/2004 | Prologo et al. | |
| 6,828,992 B1 | 12/2004 | Freeman et al. | |

| Patent No. | Date | Inventors | |
|---|---|---|---|
| 6,829,745 B2 | 12/2004 | Yassin et al. | |
| 6,847,387 B2 | 1/2005 | Roth | |
| 6,850,895 B2 | 2/2005 | Brodersen et al. | |
| 6,862,689 B2 | 3/2005 | Bergsten et al. | |
| 6,874,130 B1 | 3/2005 | Baweja et al. | |
| 6,874,143 B1 | 3/2005 | Murray | |
| 6,883,168 B1 | 4/2005 | James et al. | |
| 6,885,748 B1 | 4/2005 | Wang | |
| 6,941,129 B2 | 9/2005 | Marce et al. | |
| 6,948,129 B1 | 9/2005 | Loghmani | |
| 6,948,133 B2 * | 9/2005 | Haley | 715/780 |
| 6,950,987 B1 | 9/2005 | Hargraves et al. | |
| 6,957,395 B1 | 10/2005 | Jobs et al. | |
| 6,996,781 B1 * | 2/2006 | Myers et al. | 715/763 |
| 7,000,179 B2 | 2/2006 | Yankovich et al. | |
| 7,002,560 B2 | 2/2006 | Graham | |
| 7,003,548 B1 | 2/2006 | Barck et al. | |
| 7,010,580 B1 | 3/2006 | Fu et al. | |
| 7,013,340 B1 | 3/2006 | Burd et al. | |
| 7,020,869 B2 | 3/2006 | Abriari et al. | |
| 7,039,875 B2 * | 5/2006 | Khalfay et al. | 715/762 |
| 7,043,687 B2 | 5/2006 | Knauss et al. | |
| 7,058,645 B2 | 6/2006 | Seto et al. | |
| 7,076,728 B2 | 7/2006 | Davis et al. | |
| 7,080,083 B2 | 7/2006 | Kim et al. | |
| 7,081,882 B2 | 7/2006 | Sowden et al. | |
| 7,086,009 B2 * | 8/2006 | Resnick et al. | 715/771 |
| 7,086,042 B2 | 8/2006 | Abe et al. | |
| 7,100,147 B2 | 8/2006 | Miller et al. | |
| 7,107,522 B1 | 9/2006 | Morgan et al. | |
| 7,107,539 B2 | 9/2006 | Abbott et al. | |
| 7,120,863 B1 | 10/2006 | Wang | |
| 7,124,251 B2 | 10/2006 | Clark et al. | |
| 7,130,885 B2 | 10/2006 | Chandra et al. | |
| 7,143,341 B1 | 11/2006 | Kohli | |
| 7,146,564 B2 | 12/2006 | Kim et al. | |
| 7,152,027 B2 * | 12/2006 | Andrade et al. | 703/21 |
| 7,159,011 B1 | 1/2007 | Knight et al. | |
| 7,168,035 B1 | 1/2007 | Bell et al. | |
| 7,178,166 B1 | 2/2007 | Taylor et al. | |
| 7,197,515 B2 | 3/2007 | Rivers-Moore et al. | |
| 7,200,665 B2 | 4/2007 | Eshghi et al. | |
| 7,200,816 B1 | 4/2007 | Falk et al. | |
| 7,213,200 B2 | 5/2007 | Abe et al. | |
| 7,228,541 B2 * | 6/2007 | Gupton et al. | 717/175 |
| 7,234,105 B2 | 6/2007 | Bezrukov et al. | |
| 7,236,982 B2 | 6/2007 | Zlatanov et al. | |
| 7,237,114 B1 | 6/2007 | Rosenberg | |
| 7,249,328 B1 | 7/2007 | Davis | |
| 7,251,777 B1 | 7/2007 | Valtchev et al. | |
| 7,269,664 B2 | 9/2007 | Hutsch et al. | |
| 7,269,788 B2 | 9/2007 | Gharavy | |
| 7,272,789 B2 | 9/2007 | O'Brien | |
| 7,272,815 B1 * | 9/2007 | Eldridge et al. | 717/101 |
| 7,275,216 B2 | 9/2007 | Paoli et al. | |
| 7,281,018 B1 | 10/2007 | Begun et al. | |
| 7,281,206 B2 | 10/2007 | Schnelle et al. | |
| 7,281,245 B2 | 10/2007 | Reynar et al. | |
| 7,284,208 B2 | 10/2007 | Matthews | |
| 7,284,239 B1 | 10/2007 | Young et al. | |
| 7,287,218 B1 | 10/2007 | Knotz et al. | |
| 7,293,268 B2 | 11/2007 | Masuda et al. | |
| 7,296,017 B2 | 11/2007 | Larcheveque et al. | |
| 7,305,613 B2 | 12/2007 | Oezgen | |
| 7,308,646 B1 | 12/2007 | Cohen et al. | |
| 7,313,757 B2 | 12/2007 | Bradley et al. | |
| 7,313,758 B2 | 12/2007 | Kozlov | |
| 7,316,003 B1 | 1/2008 | Dulepet et al. | |
| 7,318,237 B2 | 1/2008 | Moriconi et al. | |
| 7,334,187 B1 | 2/2008 | Stanciu et al. | |
| 7,337,391 B2 | 2/2008 | Clarke et al. | |
| 7,337,392 B2 | 2/2008 | Lue | |
| 7,346,840 B1 | 3/2008 | Ravishankar et al. | |
| 7,346,848 B1 | 3/2008 | Ruthfield et al. | |
| 7,370,066 B1 | 5/2008 | Sikchi et al. | |
| 7,373,595 B2 | 5/2008 | Jones et al. | |
| 7,376,673 B1 | 5/2008 | Chalecki et al. | |
| 7,406,660 B1 | 7/2008 | Sikchi et al. | |
| 7,412,649 B2 | 8/2008 | Emek et al. | |
| 7,424,671 B2 | 9/2008 | Elza et al. | |
| 7,428,699 B1 | 9/2008 | Kane et al. | |
| 7,430,711 B2 | 9/2008 | Rivers-Moore et al. | |
| 7,451,392 B1 | 11/2008 | Chalecki et al. | |
| 7,490,167 B2 | 2/2009 | Pena et al. | |
| 7,496,632 B2 | 2/2009 | Chapman et al. | |
| 7,512,896 B2 | 3/2009 | Rockey et al. | |
| 7,516,399 B2 | 4/2009 | Hsu et al. | |
| 7,533,268 B1 | 5/2009 | Catorcini | |
| 7,562,215 B2 | 7/2009 | Cummins | |
| 7,568,101 B1 | 7/2009 | Catorcini | |
| 7,581,177 B1 | 8/2009 | Mollicone et al. | |
| 7,584,417 B2 | 9/2009 | Friend | |
| 7,610,562 B2 | 10/2009 | Rockey et al. | |
| 7,613,996 B2 | 11/2009 | Dallett et al. | |
| 7,624,356 B1 | 11/2009 | Rockey et al. | |
| 7,653,687 B2 | 1/2010 | Resiman | |
| 7,669,116 B2 | 2/2010 | Lopata et al. | |
| 7,712,022 B2 | 5/2010 | Smuga | |
| 7,712,048 B2 | 5/2010 | Rockey et al. | |
| 7,721,190 B2 | 5/2010 | Sikchi | |
| 7,725,834 B2 | 5/2010 | Bell | |
| 7,743,063 B2 | 6/2010 | James et al. | |
| 7,774,620 B1 | 8/2010 | Stott | |
| 7,779,027 B2 | 8/2010 | James | |
| 7,809,698 B1 | 10/2010 | Salz et al. | |
| 7,818,677 B2 | 10/2010 | Ruthfield | |
| 7,865,477 B2 | 1/2011 | Larcheveque | |
| 7,900,134 B2 | 3/2011 | Ardeleanu | |
| 7,904,801 B2 | 3/2011 | Catorcini et al. | |
| 7,913,159 B2 | 3/2011 | Larcheveque | |
| 7,925,621 B2 | 4/2011 | Sikchi | |
| 7,934,098 B1 | 4/2011 | Hahn et al. | |
| 7,937,651 B2 | 5/2011 | Kelkar | |
| 7,971,139 B2 | 6/2011 | Stanciu | |
| 7,979,856 B2 | 7/2011 | Murray | |
| 8,001,459 B2 | 8/2011 | Rivers-Moore | |
| 8,010,515 B2 | 8/2011 | Mirzad | |
| 8,074,217 B2 | 12/2011 | James | |
| 8,078,960 B2 | 12/2011 | Chalecki | |
| 2001/0003828 A1 | 6/2001 | Peterson et al. | |
| 2001/0044850 A1 | 11/2001 | Raz et al. | |
| 2001/0047372 A1 | 11/2001 | Gorelik et al. | |
| 2001/0052121 A1 | 12/2001 | Masuda et al. | |
| 2001/0056411 A1 | 12/2001 | Lindskog et al. | |
| 2002/0010700 A1 | 1/2002 | Wotring | |
| 2002/0010855 A1 | 1/2002 | Reshef et al. | |
| 2002/0019941 A1 | 2/2002 | Chan et al. | |
| 2002/0023111 A1 | 2/2002 | Arora et al. | |
| 2002/0023113 A1 | 2/2002 | Hsing et al. | |
| 2002/0026441 A1 | 2/2002 | Kutay et al. | |
| 2002/0032692 A1 | 3/2002 | Suzuki et al. | |
| 2002/0032768 A1 | 3/2002 | Voskuil | |
| 2002/0049790 A1 | 4/2002 | Ricker et al. | |
| 2002/0053021 A1 | 5/2002 | Rice et al. | |
| 2002/0054115 A1 | 5/2002 | Mack et al. | |
| 2002/0054126 A1 | 5/2002 | Gamon | |
| 2002/0054128 A1 | 5/2002 | Lau et al. | |
| 2002/0059566 A1 | 5/2002 | Delcambre et al. | |
| 2002/0065798 A1 | 5/2002 | Bostleman et al. | |
| 2002/0065847 A1 | 5/2002 | Furukawa et al. | |
| 2002/0065950 A1 | 5/2002 | Katz et al. | |
| 2002/0083145 A1 | 6/2002 | Perinpanathan | |
| 2002/0083148 A1 | 6/2002 | Shaw et al. | |
| 2002/0083318 A1 | 6/2002 | Larose | |
| 2002/0091738 A1 | 7/2002 | Rohrabaugh et al. | |
| 2002/0099952 A1 | 7/2002 | Lambert et al. | |
| 2002/0103711 A1 | 8/2002 | Karas et al. | |
| 2002/0111699 A1 | 8/2002 | Melli et al. | |
| 2002/0143815 A1 | 10/2002 | Sather | |
| 2002/0147726 A1 | 10/2002 | Yehia et al. | |
| 2002/0147748 A1 | 10/2002 | Huang | |
| 2002/0152222 A1 | 10/2002 | Holbrook | |
| 2002/0152244 A1 | 10/2002 | Dean et al. | |
| 2002/0169752 A1 | 11/2002 | Kusama et al. | |
| 2002/0178380 A1 | 11/2002 | Wolf et al. | |
| 2002/0184213 A1 | 12/2002 | Lau et al. | |
| 2002/0184401 A1 * | 12/2002 | Kadel et al. | 709/315 |
| 2002/0184485 A1 | 12/2002 | Dray et al. | |

| | | |
|---|---|---|
| 2002/0194388 A1 | 12/2002 | Boloker et al. |
| 2002/0198935 A1 | 12/2002 | Crandall et al. |
| 2003/0023953 A1 | 1/2003 | Lucassen et al. |
| 2003/0025693 A1* | 2/2003 | Haley .................. 345/418 |
| 2003/0026507 A1 | 2/2003 | Zlotnick |
| 2003/0028550 A1 | 2/2003 | Lee et al. |
| 2003/0029911 A1 | 2/2003 | Kitayama |
| 2003/0033037 A1 | 2/2003 | Yuen et al. |
| 2003/0037021 A1 | 2/2003 | Krothappalli et al. |
| 2003/0038788 A1 | 2/2003 | Demartines et al. |
| 2003/0055811 A1 | 3/2003 | Stork et al. |
| 2003/0058286 A1* | 3/2003 | Dando .................. 345/853 |
| 2003/0069881 A1 | 4/2003 | Huttunen |
| 2003/0074279 A1 | 4/2003 | Viswanath |
| 2003/0093755 A1 | 5/2003 | O'Carroll |
| 2003/0101414 A1 | 5/2003 | Liu et al. |
| 2003/0110443 A1 | 6/2003 | Yankovich et al. |
| 2003/0140160 A1 | 7/2003 | Raz et al. |
| 2003/0142072 A1 | 7/2003 | Lapstun et al. |
| 2003/0149934 A1 | 8/2003 | Worden |
| 2003/0154464 A1 | 8/2003 | Ullmann et al. |
| 2003/0163285 A1 | 8/2003 | Nakamura et al. |
| 2003/0172113 A1 | 9/2003 | Cameron et al. |
| 2003/0200506 A1 | 10/2003 | Abe et al. |
| 2003/0204481 A1 | 10/2003 | Lau |
| 2003/0212902 A1 | 11/2003 | van der Made |
| 2003/0212988 A1 | 11/2003 | Tsai et al. |
| 2003/0217053 A1 | 11/2003 | Bachman et al. |
| 2003/0218620 A1 | 11/2003 | Lai et al. |
| 2003/0220930 A1 | 11/2003 | Milleker et al. |
| 2003/0226111 A1 | 12/2003 | Wirts et al. |
| 2003/0233644 A1 | 12/2003 | Cohen et al. |
| 2003/0236903 A1 | 12/2003 | Piotrowski |
| 2003/0237046 A1 | 12/2003 | Parker et al. |
| 2003/0237047 A1 | 12/2003 | Borson |
| 2004/0002950 A1 | 1/2004 | Brennan et al. |
| 2004/0003341 A1 | 1/2004 | alSafadi et al. |
| 2004/0006744 A1 | 1/2004 | Jones et al. |
| 2004/0010753 A1 | 1/2004 | Salter |
| 2004/0015778 A1 | 1/2004 | Britton et al. |
| 2004/0015783 A1 | 1/2004 | Lennon et al. |
| 2004/0039993 A1 | 2/2004 | Kougiouris et al. |
| 2004/0046787 A1 | 3/2004 | Henry et al. |
| 2004/0046789 A1 | 3/2004 | Inanoria |
| 2004/0054966 A1 | 3/2004 | Busch et al. |
| 2004/0059754 A1* | 3/2004 | Barghout et al. .......... 707/104.1 |
| 2004/0060006 A1 | 3/2004 | Lindblad et al. |
| 2004/0088320 A1 | 5/2004 | Perry |
| 2004/0088652 A1 | 5/2004 | Abe et al. |
| 2004/0128296 A1 | 7/2004 | Krishnamurthy et al. |
| 2004/0139400 A1 | 7/2004 | Allam et al. |
| 2004/0148178 A1 | 7/2004 | Brain |
| 2004/0181543 A1 | 9/2004 | Wu et al. |
| 2004/0181711 A1 | 9/2004 | Johnson et al. |
| 2004/0189708 A1 | 9/2004 | Larcheveque et al. |
| 2004/0196266 A1 | 10/2004 | Matsuura et al. |
| 2004/0199572 A1 | 10/2004 | Hunt et al. |
| 2004/0205644 A1 | 10/2004 | Shaughnessy et al. |
| 2004/0210599 A1 | 10/2004 | Friedman et al. |
| 2004/0210645 A1 | 10/2004 | Kouznetsov et al. |
| 2004/0220912 A1 | 11/2004 | Manikutty et al. |
| 2004/0260593 A1 | 12/2004 | Abraham-Fuchs et al. |
| 2004/0261019 A1 | 12/2004 | Imamura et al. |
| 2004/0261032 A1 | 12/2004 | Olander et al. |
| 2004/0268259 A1 | 12/2004 | Rockey et al. |
| 2004/0268260 A1 | 12/2004 | Rockey et al. |
| 2005/0015279 A1 | 1/2005 | Rucker |
| 2005/0015732 A1* | 1/2005 | Vedula et al. .............. 715/805 |
| 2005/0022115 A1 | 1/2005 | Baumgartner et al. |
| 2005/0028073 A1 | 2/2005 | Henry et al. |
| 2005/0033626 A1 | 2/2005 | Kruse et al. |
| 2005/0050066 A1 | 3/2005 | Hughes |
| 2005/0060647 A1* | 3/2005 | Doan et al. ................. 715/514 |
| 2005/0060721 A1 | 3/2005 | Choudhary et al. |
| 2005/0076022 A1 | 4/2005 | Wu et al. |
| 2005/0080801 A1 | 4/2005 | Kothandaraman et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0132043 A1 | 6/2005 | Wang et al. |
| 2005/0132196 A1 | 6/2005 | Dietl |
| 2005/0138031 A1 | 6/2005 | Wefers |
| 2005/0138539 A1 | 6/2005 | Bravery et al. |
| 2005/0149375 A1 | 7/2005 | Wefers |
| 2005/0159136 A1 | 7/2005 | Rouse et al. |
| 2005/0160398 A1 | 7/2005 | Bjornson et al. |
| 2005/0183006 A1 | 8/2005 | Rivers-Moore et al. |
| 2005/0198125 A1 | 9/2005 | Beck et al. |
| 2005/0210263 A1 | 9/2005 | Levas et al. |
| 2005/0234890 A1 | 10/2005 | Enzler et al. |
| 2005/0240620 A1 | 10/2005 | Danner et al. |
| 2005/0240876 A1 | 10/2005 | Myers et al. |
| 2005/0246304 A1 | 11/2005 | Knight et al. |
| 2005/0256933 A1 | 11/2005 | Millington et al. |
| 2005/0257148 A1 | 11/2005 | Goodman et al. |
| 2005/0262112 A1 | 11/2005 | Moore |
| 2006/0004910 A1 | 1/2006 | Burd et al. |
| 2006/0020883 A1 | 1/2006 | Kothari et al. |
| 2006/0026500 A1 | 2/2006 | Qa 'Im-maqami' |
| 2006/0041593 A1 | 2/2006 | Borthakur et al. |
| 2006/0059107 A1 | 3/2006 | Elmore et al. |
| 2006/0069985 A1 | 3/2006 | Friedman et al. |
| 2006/0074981 A1 | 4/2006 | Mauceri |
| 2006/0075245 A1 | 4/2006 | Meier |
| 2006/0080657 A1 | 4/2006 | Goodman |
| 2006/0101037 A1 | 5/2006 | Brill et al. |
| 2006/0101051 A1 | 5/2006 | Carr et al. |
| 2006/0129583 A1 | 6/2006 | Catorcini et al. |
| 2006/0129978 A1 | 6/2006 | Abriani et al. |
| 2006/0136422 A1 | 6/2006 | Matveief et al. |
| 2006/0155857 A1 | 7/2006 | Feenan et al. |
| 2006/0161559 A1 | 7/2006 | Bordawekar et al. |
| 2006/0173865 A1 | 8/2006 | Fong |
| 2006/0184393 A1 | 8/2006 | Ewin et al. |
| 2006/0191662 A1 | 8/2006 | Deibl et al. |
| 2006/0195413 A1 | 8/2006 | Davis et al. |
| 2006/0200754 A1 | 9/2006 | Kablesh et al. |
| 2006/0203081 A1 | 9/2006 | Pulitzer |
| 2006/0248468 A1 | 11/2006 | Constantine et al. |
| 2006/0271839 A1 | 11/2006 | Gottlieb et al. |
| 2007/0005978 A1 | 1/2007 | O'Connor |
| 2007/0100967 A1 | 5/2007 | Smith et al. |
| 2007/0118538 A1 | 5/2007 | Ahern et al. |
| 2007/0118803 A1 | 5/2007 | Walker et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |
| 2007/0208769 A1 | 9/2007 | Boehm et al. |
| 2008/0021916 A1 | 1/2008 | Schnelle et al. |
| 2008/0027896 A1 | 1/2008 | Anjur |
| 2008/0028340 A1 | 1/2008 | Davis |
| 2008/0040635 A1 | 2/2008 | Larcheveque |
| 2008/0052287 A1 | 2/2008 | Stanciu |
| 2008/0134162 A1 | 6/2008 | James |
| 2008/0162498 A1 | 7/2008 | Omoigui |
| 2008/0189335 A1 | 8/2008 | Sikchi |
| 2008/0222514 A1 | 9/2008 | Rivers-Moore |
| 2009/0044103 A1 | 2/2009 | Chalecki et al. |
| 2009/0070411 A1 | 3/2009 | Chang et al. |
| 2009/0119580 A1 | 5/2009 | Rohrabaugh et al. |
| 2009/0138389 A1 | 5/2009 | Barthel |
| 2009/0177961 A1 | 7/2009 | Fortini |
| 2010/0125778 A1 | 5/2010 | Kelkar |
| 2010/0229110 A1 | 9/2010 | Rockey et al. |
| 2011/0173560 A1 | 7/2011 | Larcheveque |
| 2011/0239101 A1 | 9/2011 | Rivers-Moore |
| 2011/0246868 A1 | 10/2011 | Stanciu |

FOREIGN PATENT DOCUMENTS

| | | |
|---|---|---|
| JP | 04290126 | 10/1992 |
| JP | 406014105 | 1/1994 |
| JP | 08263246 | 10/1996 |
| JP | 08263247 | 10/1996 |
| JP | 09016801 | 1/1997 |
| JP | 09134273 | 5/1997 |
| JP | 09146736 | 6/1997 |
| JP | 09190327 | 7/1997 |

| | | |
|---|---|---|
| JP | 09251370 | 9/1997 |
| JP | 09292967 | 11/1997 |
| JP | 10011255 | 1/1998 |
| JP | 10097559 | 4/1998 |
| JP | 10171662 | 6/1998 |
| JP | 10207805 | 8/1998 |
| JP | 10232754 | 9/1998 |
| JP | 10240434 | 9/1998 |
| JP | 10260765 | 9/1998 |
| JP | 2000029713 | 1/2000 |
| JP | 2003296235 | 10/2003 |
| JP | 2003316769 | 11/2003 |
| JP | 2003337648 | 11/2003 |
| JP | 2004054749 | 2/2004 |
| JP | 2004341675 | 12/2004 |
| JP | 4833490 | 9/2011 |
| RU | 2413987 | 3/2011 |

OTHER PUBLICATIONS

"Final Office Action", U.S. Appl. No. 11/107,347, (Mar. 22, 2010), 11 pages.
"Final Office Action", U.S. Appl. No. 11/218,149, (May 19, 2010), 17 pages.
"Foreign Office Action", Australian Patent Application No. 2006200285, (May 20, 2010), 2 pages.
"Foreign Office Action", Russian Application No. 2006103267, (Apr. 20, 2010), 10 pages.
"Foreign Office Action", Russian Application No. 2006105526, (Apr. 15, 2010), 10 pages.
"Non-Final Office Action", U.S. Appl. No. 10/402,640, (Apr. 30, 2010), 4 pages.
"Non-Final Office Action", U.S. Appl. No. 10/916,692, (Apr. 5, 2010), 6 pages.
"Non-Final Office Action", U.S. Appl. No. 10/976,451, (Apr. 9, 2010), 11 pages.
"Non-Final Office Action", U.S. Appl. No. 11/295,178, (May 26, 2010), 45 pages.
"Notice of Allowance", U.S. Appl. No. 11/557,931, (May 5, 2010), 7 pages.
"Notice of Allowance", U.S. Appl. No. 11/872,703, (May 14, 2010), 18 pages.
"Supplemental Notice of Allowance", U.S. Appl. No. 10/990,152, (Apr. 19, 2010), 2 pages.
"Supplemental Notice of Allowance", U.S. Appl. No. 11/044,106, (May 13, 2010), 6 pages.
"Supplemental Notice of Allowance", U.S. Appl. No. 11/044,106, (May 19, 2010), 5 pages.
"Supplemental Notice of Allowance", U.S. Appl. No. 11/072,087, (Apr. 19, 2010), 2 pages.
"Final Office Action", U.S. Appl. No. 10/609,274, (Oct. 3, 2008), 50 pages.
"Final Office Action", U.S. Appl. No. 10/609,274, (Oct. 31, 2007), 41 pages.
"Final Office Action", U.S. Appl. No. 10/770,240, (Apr. 13, 2011), 17 pages.
"Final Office Action", U.S. Appl. No. 10/770,240, (Jun. 26, 2009), 15 pages.
"Final Office Action", U.S. Appl. No. 10/770,240, (Jun. 29, 2007), 28 pages.
"Final Office Action", U.S. Appl. No. 11/927,296, (Jul. 7, 2011), 12 pages.
"Foreign Office Action", European Patent Application No. 01935325.9, (Jun. 20, 2011), 5 pages.
"Non-Final Office Action", U.S. Appl. No. 10/609,274, (Jan. 17, 2007), 43 pages.
"Non-Final Office Action", U.S. Appl. No. 10/609,274, (Apr. 2, 2008), 43 pages.
"Non-Final Office Action", U.S. Appl. No. 10/770,240, (Oct. 29, 2010), 14 pages.
"Non-Final Office Action", U.S. Appl. No. 10/770,240, (May 1, 2008), 30 pages.
"Non-Final Office Action", U.S. Appl. No. 10/770,240, (May 13, 2010), 15 pages.
"Non-Final Office Action", U.S. Appl. No. 10/770,240, (Aug. 24, 2006), 25 pages.
"Non-Final Office Action", U.S. Appl. No. 11/170,521, (Aug. 3, 2011), 16 pages.
"Notice of Allowance", U.S. Appl. No. 11/927,296, (Aug. 8, 2011), 7 pages.
Moats, R. "A URN Namespace for IETF Documents", *RFC 2648*, (Aug. 1999), pp. 1-30.
Moats, R. "URN Syntax", *RFC 2141*, (May 1997), pp. 1-8.
Sollins, et al., "Functional Requirements for Uniform Resource Names", *RFC 1737*, (Dec. 1994), pp. 1-7.
"About Microsoft Word", Microsoft Word 2000, published 1983-1999, and Microsoft Excel 2000 (see Screen Shot "About Microsoft Excel") Published 1988-1999, (Oct. 21, 2005), 3 pages.
"Advisory Action", U.S. Appl. No. 10/898,657, (Mar. 25, 2008), 3 pages.
"Copying the Search Form to Services-based Web Sites", *Cybook, Inc., the whole document*, (Jul. 26, 2004), 1 page.
"Dreamweaver Technote: Changes in copying and pasting in Dreamweaver 4", http://store1.adobe.com/cfusion/knowledgebase/index.cfm?id=tn__15152, (Mar. 2001), 2 pages.
"Final Office Action", U.S. Appl. No. 09/599,086, (Mar. 6, 2008), 47 pages.
"Final Office Action", U.S. Appl. No. 09/599,086, (May 10, 2007), 41 pages.
"Final Office Action", U.S. Appl. No. 09/599,086, (May 25, 2004), 23 pages.
"Final Office Action", U.S. Appl. No. 09/599,086, (Jul. 5, 2006), 34 pages.
"Final Office Action", U.S. Appl. No. 09/599,086, (Aug. 8, 2005), 27 pages.
"Final Office Action", U.S. Appl. No. 09/599,299, (Apr. 20, 2004), 23 pages.
"Final Office Action", U.S. Appl. No. 09/599,812, (Aug. 12, 2003), 38 pages.
"Final Office Action", U.S. Appl. No. 10/178,291, (Dec. 19, 2005), 21 pages.
"Final Office Action", U.S. Appl. No. 10/723,188, (Jan. 9, 2009), 20 pages.
"Final Office Action", U.S. Appl. No. 10/723,863, (Sep. 19, 2007), 34 Pages.
"Final Office Action", U.S. Appl. No. 10/846,428, (Mar. 3, 2008), 23 pages.
"Final Office Action", U.S. Appl. No. 10/897,647, (Mar. 6, 2008), 25 pages.
"Final Office Action", U.S. Appl. No. 10/897,647, (Jul. 14, 2009), 36 pages.
"Final Office Action", U.S. Appl. No. 10/898,656, (Nov. 15, 2007), 16 pages.
"Final Office Action", U.S. Appl. No. 10/898,657, (Jan. 3, 2008), 21 pages.
"Foreign Decision of Grant", Russian Application No. 2006105526, (Nov. 8, 2010), 16 pages.
"Foreign Office Action", Canadian Application No. 2408313, (Oct. 26, 2010), 5 pages.
"Foreign Office Action", Canadian Application No. 2412611, (Oct. 26, 2010), 2 pages.
"Foreign Office Action", European Patent Application No. 01939034.3, (Nov. 5, 2007), 3 pages.
"Manual of Patent Office Practice", *Computer-Implemented Inventions, Chapter 16.09.02, Data Structures*, (Oct. 2010), 3 pages.
"Microsoft Computer Dictionary 5th Edition", *Entry for "Stack," Microsoft Press*, ISBN 0-7356-1495-4, (May 1, 2002), p. 495.
"Non Final Office Action", U.S. Appl. No. 09/599,086, (Jan. 30, 2006), 33 pages.
"Non Final Office Action", U.S. Appl. No. 09/599,086, (Oct. 28, 2003), 21 pages.
"Non Final Office Action", U.S. Appl. No. 09/599,086, (Oct. 31, 2007), 48 pages.
"Non Final Office Action", U.S. Appl. No. 09/599,086, (Nov. 13, 2006), 33 pages.
"Non Final Office Action", U.S. Appl. No. 09/599,086, (Nov. 14, 2008), 55 pages.

"Non Final Office Action", U.S. Appl. No. 09/599,086, (Mar. 3, 2005), 25 pages.
"Non Final Office Action", U.S. Appl. No. 10/178,291, (Nov. 26, 2004), 21 pages.
"Non Final Office Action", U.S. Appl. No. 10/178,291, (Apr. 29, 2004), 14 pages.
"Non Final Office Action", U.S. Appl. No. 10/178,291, (Jun. 27, 2005), 22 pages.
"Non Final Office Action", U.S. Appl. No. 10/897,647, (Nov. 14, 2008), 28 pages.
"Non Final Office Action", U.S. Appl. No. 10/897,647, (Sep. 6, 2007), 21 pages.
"Non Final Office Action", U.S. Appl. No. 10/898,656, (Apr. 18, 2008), 17 pages.
"Non Final Office Action", U.S. Appl. No. 10/898,656, (Jul. 13, 2007), 13 pages.
"Non Final Office Action", U.S. Appl. No. 10/898,657, (Jul. 18, 2007), 18 pages.
"Non Final Office Action", U.S. Appl. No. 10/898,657, (Sep. 8, 2008), 24 pages.
"Non-Final Office Action", U.S. Appl. No. 09/599,299, (Oct. 28, 2003), 32 pages.
"Non-Final Office Action", U.S. Appl. No. 09/599,299, (Aug. 12, 2004), 12 pages.
"Non-Final Office Action", U.S. Appl. No. 09/599,812, (Feb. 27, 2003), 20 pages.
"Non-Final Office Action", U.S. Appl. No. 09/599,812, (Feb. 5, 2004), 35 pages.
"Non-Final Office Action", U.S. Appl. No. 10/723,863, (Feb. 8, 2007), 30 Pages.
"Non-Final Office Action", U.S. Appl. No. 10/723,863, (Aug. 23, 2006), 16 Pages.
"Non-Final Office Action", U.S. Appl. No. 10/723,863, (Nov. 6, 2007), 7 Pages.
"Non-Final Office Action", U.S. Appl. No. 10/846,428, (Oct. 15, 2008), 23 pages.
"Non-Final Office Action", U.S. Appl. No. 10/846,428, (Jul. 19, 2007), 19 pages.
"Non-Final Office Action", U.S. Appl. No. 10/976,451, (Nov. 10, 2010), 9 pages.
"Non-Final Office Action", U.S. Appl. No. 11/234,767, (Nov. 26, 2010), 28 pages.
"Notice of Allowance", U.S. Appl. No. 09/599,086, (Aug. 17, 2009), 59 pages.
"Notice of Allowance", U.S. Appl. No. 09/599,299, (Nov. 30, 2004), 7 pages.
"Notice of Allowance", U.S. Appl. No. 09/599,812, (Aug. 3, 2004), 12 pages.
"Notice of Allowance", U.S. Appl. No. 10/178,291, (Feb. 6, 2006), 7 pages.
"Notice of Allowance", U.S. Appl. No. 10/723,863, (Jun. 30, 2008), 9 Pages.
"Notice of Allowance", U.S. Appl. No. 10/846,428, (Apr. 29, 2009), 10 pages.
"Notice of Allowance", U.S. Appl. No. 10/897,647, (Jan. 19, 2010), 13 pages.
"Notice of Allowance", U.S. Appl. No. 10/898,656, (Jan. 2, 2009), 9 pages.
"Notice of Allowance", U.S. Appl. No. 10/898,657, (Jun. 11, 2009), 20 pages.
"Notice of Allowance", U.S. Appl. No. 11/036,910, (Dec. 7, 2010), 7 pages.
"Notice of Allowance", U.S. Appl. No. 11/107,347, (Dec. 13, 2010), 11 pages.
"Notice of Allowance", U.S. Appl. No. 12/021,894, (Oct. 29, 2010), 9 pages.
"PCT Search Report", PCT Application No. PCT/US01/15581, (Jan. 29, 2003), 3 pages.
Asche, Ruediger R., "Multithreading for Rookies", *Microsoft Developer Network Technology Group*, Retrieved Apr. 17, 2002 from http://msdn.microsoft.com/library/en-us/dndllpro/html/msdn_threads.asp?frame=true, (Sep. 24, 1993), 13 pages.

Kath, Randy "Managing Virtual Memory in Win32", *Microsoft Developer Network Technology Group*, Retrieved Apr. 17, 2002 from http://msdn.microsoft.comilibrary/en-us/dngenlib/html/msdn_virtmm.asp?frame=true, (Jan. 20, 1993), 9 pages.
Sato, T. et al., "XFIG Version 3.2 Patchlevel 2 Users Manual Edition 1.0", Available at http://tinf2.vub.ac.be/~dvermeir/manuals/xfig/lib/X11/xfig/html/index.html, (Jul. 2, 1998), 37 pages.
"Advisory Action", U.S. Appl. No. 10/185,048, (Jun. 20, 2006), 3 Pages.
"Advisory Action", U.S. Appl. No. 10/185,048, (Sep. 16, 2005), 3 Pages.
"Advisory Action", U.S. Appl. No. 10/632,437, (Aug. 23, 2006), 3 pages.
"Advisory Action", U.S. Appl. No. 10/916,692, (Dec. 10, 2008), 3 Pages.
"Applicants' Statement Regarding a Non-Public Use", (May 31, 2006), 1 page.
"EP Search Report", EP Application No. 00306806, (Jul. 16, 2003), 3 pages.
"EP Search Report", EP Application No. 05112241.4, (Mar. 18, 2010), 10 pages.
"EP Search Report", EP Application No. 97307138, (Mar. 21, 2003), 3 pages.
"Final Office Action", U.S. Appl. No. 10/185,048, (Mar. 13, 2006), 14 Pages.
"Final Office Action", U.S. Appl. No. 10/185,048, (Jun. 3, 2005), 14 Pages.
"Final Office Action", U.S. Appl. No. 10/632,437, (Jan. 25, 2008), 25 pages.
"Final Office Action", U.S. Appl. No. 10/632,437, (Jun. 1, 2006), 21 pages.
"Final Office Action", U.S. Appl. No. 10/781,586, (Aug. 9, 2007), 20 pages.
"Final Office Action", U.S. Appl. No. 10/876,418, (May 22, 2008), 14 pages.
"Final Office Action", U.S. Appl. No. 10/916,692, (Oct. 2, 2008), 10 Pages.
"Final Office Action", U.S. Appl. No. 10/976,451, (Apr. 6, 2011), 10 pages.
"Final Office Action", U.S. Appl. No. 10/988,732, (Nov. 12, 2010), 37 pages.
"Final Office Action", U.S. Appl. No. 11/095,254, (Dec. 22, 2008), 9 pages.
"Final Office Action", U.S. Appl. No. 11/234,767, (Mar. 10, 2011), 28 pages.
"Final Office Action", U.S. Appl. No. 12/061,613, (Apr. 28, 2011), 11 pages.
"Foreign Office Action", EP Application No. 05112241.4, (Dec. 23, 2010), 6 pages.
"Foreign Office Action", Japanese Application 2002-504575, (Dec. 14, 2010), 4 pages.
"Foreign Office Action", Japanese Application No. 2002-503700, (May 10, 2011), 5 pages.
"Foreign Office Action", Japanese Application No. 2002-503701, (May 31, 2011), 10 pages.
"Foreign Office Action", Japanese Application No. 2006-071589, (Mar. 29, 2011), 9 pages.
"Mott Porous Metal. The Most Reliable Means of Restricting Gas Flow", *Mott Corporation Webpage*, retrieved from <<http://www.mottcorp.com/industry/oem/oem_flowers.htm>> on Aug. 23, 2004, 4 pages.
"Non Final Office Action", U.S. Appl. No. 09/599,806, (Mar. 12, 2003), 7 pages.
"Non Final Office Action", U.S. Appl. No. 09/599,806, (Aug. 17, 2004), 5 pages.
"Non Final Office Action", U.S. Appl. No. 10/395,505, (Sep. 11, 2006), 8 pages.
"Non Final Office Action", U.S. Appl. No. 10/632,437, (Dec. 16, 2005), 22 pages.
"Non Final Office Action", U.S Appl. No. 10/632,437, (Jul. 26, 2007), 19 pages.
"Non Final Office Action", U.S. Appl. No. 10/632,437, (Sep. 10, 2008), 28 pages.

"Non Final Office Action", U.S. Appl. No. 10/770,240, (May 1, 2008), 30 pages.
"Non Final Office Action", U.S. Appl. No. 10/770,240, (Aug. 24, 2004), 25 pages.
"Non Final Office Action", U.S. Appl. No. 12/126,532, (Mar. 24, 2011), 23 pages.
"Non Final Office Action", U.S. Appl. No. 12/249,973), (Apr. 12, 2011), 8 pages.
"Non-Final Office Action", U.S. Appl. No. 10/185,048, (Dec. 8, 2004), 14 Pages.
"Non-Final Office Action", U.S. Appl. No. 10/610,504, (Mar. 9, 2006), 12 Pages.
"Non-Final Office Action", U.S. Appl. No. 10/781,586, (Oct. 20, 2006), 21 pages.
"Non-Final Office Action", U.S. Appl. No. 10/871,586, (Jan. 9, 2008), 22 pages.
"Non-Final Office Action", U.S. Appl. No. 10/876,418, (Sep. 13, 2007), 14 pages.
"Non-Final Office Action", U.S. Appl. No. 10/916,692, (Apr. 1, 2008), 9 Pages.
"Non-Final Office Action", U.S. Appl. No. 11/095,254, (Apr. 17, 2008), 8 pages.
"Non-Final Office Action", U.S. Appl. No. 11/927,296, (Mar. 4, 2011), 19 pages.
"Non-Final Office Action", U.S. Appl. No. 12/028,651, (Jan. 3, 2011), 16 pages.
"Notice of Allowance", U.S. Appl. No. 09/599,806, (Jan. 21, 2005), 9 pages.
"Notice of Allowance", U.S. Appl. No. 10/395,505, (Oct. 4, 2006), 8 pages.
"Notice of Allowance", U.S. Appl. No. 10/610,504, (Sep. 6, 2006), 4 Pages.
"Notice of Allowance", U.S. Appl. No. 10/632,437, (May 21, 2009), 15 pages.
"Notice of Allowance", U.S. Appl. No. 10/781,586, (May 9, 2008), 6 pages.
"Notice of Allowance", U.S. Appl. No. 10/876,418, (Dec. 31, 2008), 8 pages.
"Notice of Allowance", U.S. Appl. No. 11/012,472, (Nov. 24, 2010), 6 pages.
"Notice of Allowance", U.S. Appl. No. 11/218,149, (Feb. 11, 2011), 7 pages.
"Notice of Allowance", U.S. Appl. No. 11/295,178, (Mar. 22, 2011), 20 pages.
"Notice of Allowance", U.S. Appl. No. 11/931,730, (Feb. 2, 2011), 7 pages.
"Notice of Reexamination", Chinese Application No. 01813138.7, (Apr. 22, 2011), 14 pages.
"OLE Open Doc and Network", Retrieved from http://www.pcwebopedia.com on May 9, 2006, Webopedia entries,(May 16, 1998), 7 pages.
"PCT Search Report", PCT Application No. PCT/IB98/01392, (Apr. 9, 1999), 3 pages.
"PCT Search Report", PCT Application No. PCT/IB99/02003, (Nov. 28, 2000), 3 pages.
"PCT Search Report", PCT Application No. PCT/US99/09620, (Sep. 22, 1999), 3 pages.
"Restriction Requirement", U.S. Appl. No. 09/599,806, (Mar. 3, 2003), 5 pages.
"Restriction Requirement", U.S. Appl. No. 10/770,240, (Jan. 26, 2009), 7 pages.
"Restriction Requirement", U.S. Appl. No. 10/781,586, (Jun. 26, 2006), 5 pages.
"Restriction Requirement", U.S. Appl. No. 11/095,254, (Nov. 1, 2007), 8 pages.
"Supplemental Notice of Allowance", U.S. Appl. No. 10/781,586, (Jul. 18, 2008), 3 pages.
"Supplemental Notice of Allowance", U.S. Appl. No. 10/781,586, (Jun. 4, 2008), 2 pages.
"Supplemental Notice of Allowance", U.S. Appl. No. 11/036,910, (Jan. 5, 2011), 2 pages.
"Supplemental Notice of Allowance", U.S. Appl. No. 11/107,347, (Jun. 10, 2011), 10 pages.
"Supplemental Notice of Allowance", U.S. Appl. No. 11/218,149, (Apr. 5, 2011), 2 pages.
"Supplemental Notice of Allowance", U.S. Appl. No. 11/218,149, (Jun. 6, 2011), 2 pages.
"Supplemental Notice of Allowance", U.S. Appl. No. 11/931,730, (Mar. 2, 2011), 2 pages.
"Supplemental Notice of Allowance", U.S. Appl. No. 11/931,730, (Apr. 22, 2011), 2 pages.
"Supplemental Notice of Allowance", U.S. Appl. No. 11/931,730, (May 6, 2011), 2 pages.
"Supplemental Notice of Allowance", U.S. Appl. No. 12/021,894, (Jan. 12, 2011), 6 pages.
"Supplemental Notice of Allowance", U.S. Appl. No. 12/021,894, (Feb. 8, 2011), 6 pages.
Altova, "www.xmlspy.com Spy 4 You User and Reference Manual Version 4.4", available at <http://v44.sw.altova.com/SpyManual44.pdf>,(May 24, 2002), pp. 1-605.
Baldwin, J F., et al., "A Mass Assignment Based ID3 Algorithm for Decision Tree Introduction", *International Journal of Intelligent Systems*, vol. 12, No. 7, (1997), pp. 523-548.
Cloete, I et al., "CID3: An Extension of ID3 for Attributes with Ordered Domains", *South African Computer Journal*, vol. 4, (1991), pp. 10-16.
Hall, Richard S., "Evaluating Software Deployment Languages and Schema", In Proceedings of International Conference on Software Maintenance,(Nov. 1998), 9 pages.
Hall, Richards S., et al., "Specifying the Deployable Software Description Format in XML", CU-SERL-207-99, Software Engineering Research Laboratory, University of Colorado at Boulder,(Mar. 31, 1999), 17 pages.
Mehta, Manish et al., "SLIQ: A Fast Scalable Classifer for Data Mining", available at <<http://www.dbis.informatik.hu-berlin.de/dbisold/lehre/WS0405/KDD/paper/MAR96.pdf>>, (Mar. 1996), 15 Pages.
Prosise, Jeff "Programming Microsoft Net", retrieved from: <http://academic.safaribooksonline.com/print?xmlid=0-7356-1376-1/IDAVO3T> on Mar. 3, 2011, Microsoft Press,(May 15, 2002), 24 pages.
Reilly, Douglas J., "Programming Microsoft Web Forms", retrieved from: <http://academic.safaribooksonline.com/print?xmlid=0735621799/systemdotwebdotuidotweb> on Mar. 3, 2011, Microsoft Press,(Nov. 2, 2005), 52 pages.
Sebastiani, F "A Tutorial on Automated Text Categorisation", In Analia Amandi and Ricardo Zunino, editors, *Proceedings of ASAI-99, 1st Argentinean Symposium on Artificial Intellligence*, Buenos Aires, AR, (1999), pp. 7-35.
W3C, "XForms 1.0", retrieved from <file:///HI/NPL/W3C XForms1_0—Working Draft 20010216.thm> on Apr. 5, 2011,(Feb. 16, 2001), 4 pages.
Zaki, Mohammed J., et al., "Parallel Classification for Data Mining on Shared-Memory Multiprocessors", *ACM*, (Mar. 1999), pp. 1-8.
"European Search Report", EP Application No. 06111546.5, (Nov. 9, 2006),5 pages.
"Final Office Action", U.S. Appl. No. 10/402,640, (Sep. 10, 2007),16 pages.
"Final Office Action", U.S. Appl. No. 10/955,087, (May 16, 2008),13 pages.
"Final Office Action", U.S. Appl. No. 10/955,666, (Oct. 31, 2008),24 pages.
"Final Office Action", U.S. Appl. No. 10/955,666, (Aug. 30, 2007),19 pages.
"Final Office Action", U.S. Appl. No. 10/976,451, (Jul. 27, 2010),12 pages.
"Final Office Action", U.S. Appl. No. 10/977,198, (Sep. 3, 2008),13 pages.
"Final Office Action", U.S. Appl. No. 10/977,198, (Oct. 11, 2007),10 pages.
"Final Office Action", U.S. Appl. No. 10/988,718, (Jan. 30, 2008),15 pages.
"Final Office Action", U.S. Appl. No. 10/988,718, (Dec. 22, 2008),17 pages.
"Final Office Action", U.S. Appl. No. 10/988,732, (Nov. 13, 2009),33 pages.

"Final Office Action", U.S. Appl. No. 10/988,732, (Dec. 10, 2008), 29 pages.
"Final Office Action", U.S. Appl. No. 11/012,472, (Mar. 23, 2010), 10 pages.
"Final Office Action", U.S. Appl. No. 11/170,521, (Jun. 29, 2010), 13 pages.
"Final Office Action", U.S. Appl. No. 11/227,550, (Aug. 19, 2010), 12 pages.
"Final Office Action", U.S. Appl. No. 11/295,178, (Jul. 30, 2010), 43 pages.
"Foreign Decision of Grant", Russian Application No. 2006103267, (Aug. 13, 2010), 18 pages.
"Foreign Office Action", Chinese Application No. 200610051554.X, (Jun. 25, 2010), 10 pages.
"Foreign Office Action", EP Application No. 01935325.9, (Jul. 20, 2010), 6 pages.
"Foreign Office Action", European Patent Application No. 01939368.5, (Feb. 25, 2010), 3 pages.
"Foreign Office Action", Japanese Application No. 2002-530701, (Aug. 10, 2010), 11 pages.
"Foreign Office Action", Russian Application No. 2006105526, (Aug. 24, 2010), 4 pages.
"Issue Notification", U.S. Appl. No. 10/955,087, (Mar. 18, 2009), 1 page.
"Issue Notification", U.S. Appl. No. 10/988,718, (Aug. 12, 2009), 1 page.
"Issue Notification", U.S. Appl. No. 11/095,254, (Feb. 10, 2010), 1 page.
"Issue Notification", U.S. Appl. No. 11/276,585, (Jan. 21, 2009), 1 page.
"Lotus Notes Release 5, Step by Step", *Lotus Development Corporation*, (1999), 224 pages.
"Netscape Window", *Netscape Screenshot*, (Oct. 2, 2002), 1 page.
"Non Final Office Action", U.S. Appl. No. 10/402,640, (Oct. 6, 2006), 15 pages.
"Non Final Office Action", U.S. Appl. No. 10/402,640, (Feb. 12, 2008), 16 pages.
"Non Final Office Action", U.S. Appl. No. 10/402,640, (Apr. 25, 2007), 16 pages.
"Non Final Office Action", U.S. Appl. No. 10/402,640, (Sep. 8, 2008), 16 pages.
"Non Final Office Action", U.S. Appl. No. 10/955,087, (Nov. 19, 2007), 22 pages.
"Non Final Office Action", U.S. Appl. No. 10/955,666, (Dec. 26, 2006), 20 pages.
"Non Final Office Action", U.S. Appl. No. 10/955,666, (Feb. 4, 2008), 20 pages.
"Non Final Office Action", U.S. Appl. No. 10/977,198, (Jan. 10, 2008), 10 pages.
"Non Final Office Action", U.S. Appl. No. 10/977,198, (Mar. 9, 2007), 9 pages.
"Non Final Office Action", U.S. Appl. No. 10/988,718, (Jan. 25, 2007), 13 pages.
"Non Final Office Action", U.S. Appl. No. 10/988,718, (Jul. 21, 2008), 18 pages.
"Non Final Office Action", U.S. Appl. No. 10/988,718, (Jul. 26, 2007), 21 pages.
"Non-Final Office Action", U.S. Appl. No. 10/854,961, (Nov. 15, 2006), 21 pages.
"Non-Final Office Action", U.S. Appl. No. 10/955,665, (Sep. 11, 2008), 16 pages.
"Non-Final Office Action", U.S. Appl. No. 10/988,732, (Apr. 1, 2008), 27 pages.
"Non-Final Office Action", U.S. Appl. No. 10/988,732, (May 26, 2010), 36 pages.
"Non-Final Office Action", U.S. Appl. No. 10/988,732, (Jun. 11, 2009), 30 pages.
"Non-Final Office Action", U.S. Appl. No. 11/012,472, (Oct. 6, 2009), 8 pages.
"Non-Final Office Action", U.S. Appl. No. 11/012,472, (Jul. 1, 2010), 9 pages.
"Non-Final Office Action", U.S. Appl. No. 11/036,910, (Aug. 19, 2010), 8 pages.
"Non-Final Office Action", U.S. Appl. No. 11/107,347, (Jul. 9, 2010), 16 pages.
"Non-Final Office Action", U.S. Appl. No. 11/218,149, (Sep. 20, 2010), 15 pages.
"Non-Final Office Action", U.S. Appl. No. 12/061,613, (Sep. 28, 2010), 9 pages.
"Notice of Allowance", U.S. Appl. No. 10/402,640, (Jun. 15, 2010), 6 pages.
"Notice of Allowance", U.S. Appl. No. 10/854,961, (Jun. 14, 2007), 12 pages.
"Notice of Allowance", U.S. Appl. No. 10/916,692, (Jun. 14, 2010), 6 pages.
"Notice of Allowance", U.S. Appl. No. 10/955,087, (Dec. 11, 2008), 10 pages.
"Restriction Requirement", U.S. Appl. No. 10/402,640, (Aug. 29, 2006), 5 pages.
"Restriction Requirement", U.S. Appl. No. 11/012,472, (Jun. 9, 2009), 7 pages.
Burch, Barbara "Notes R5 Technical Overview", Retrieved from: <http://www.ibm.com/developerworks/lotus/library/1s-Notes_R5_Technical_Overview> on Aug. 13, 2010, (Apr. 1, 1999), 14 pages.
Esposito, Dino "Cutting Edge No. 8", *Microsoft Internet Developer*, (Jan. 18, 2000), 13 pages.
Howlett, Scott et al., "A New Function for SQL Server 2000", *MSDN Magazine*, No. 1, (Mar. 2000), 9 pages.
Pacheco, Xavier et al., "Delphi 5 Developers Guide", Sams Publishing. Chapter 31, Section: Data Streaming, (1999), 4.
"Final Office Action", U.S. Appl. No. 10/976,451, (Jul. 2, 2009), 13 pages.
Reagan, Moore W., et al., "Collection-based persistent digital archives", U.S. Appl. No. 60/191,662, filed Mar. 23, 2000, 133.
"Non-Final Office Action", U.S. Appl. No. 11/227,550, (Aug. 3, 2009), 10 pages.
"Notice of Allowance", U.S. Appl. No. 11/203,937, (Aug. 3, 2009), 7 pages.
"Foreign Office Action", Application Serial No. 200610051554.X, (Jul. 10, 2009), 11 pages.
"Non-Final Office Action", U.S. Appl. No. 11/234,767, (Aug. 12, 2009), 24 pages.
"Final Office Action", U.S. Appl. No. 10/977,198, (Aug. 19, 2009), 15 pages.
"Non-Final Office Action", U.S. Appl. No. 10/939,588, (Aug. 27, 2009), 28 pages.
"Final Office Action", U.S. Appl. No. 11/170,521, (Sep. 8, 2009), 12 pages.
"Final Office Action", U.S. Appl. No. 10/402,640, (Aug. 28, 2009), 17 pages.
"Foreign Office Action", Application Serial No. 200610051544.X, (Dec. 4, 2009), 9 pages.
"Final Office Action", U.S. Appl. No. 11/227,550, (Jan. 19, 2010), 12 pages.
"Final Office Action", U.S. Appl. No. 11/234,767, (Jan. 26, 2010), 23 pages.
"Notice of Allowance", U.S. Appl. No. 11/872,703, (Jan. 27, 2010), 19 pages.
"Supplemental Notice of Allowance", U.S. Appl. No. 10/955,665, (Feb. 4, 2010), 2 pages.
"Supplemental Notice of Allowance", U.S. Appl. No. 10/955,665, (Nov. 27, 2009), 2 pages.
Bradley, Neil "The XML Companion, Third Edition", Published by *Addison Wesley Professional*, http://proquest.safaribooksonline.com0201770598, http, (Dec. 12, 2001), 1-18.
Klarlund, Nils "DSD: A Schema Language for XML", *ACM, FSMP* Portland Oregon, (2000), 101-111.
Watt, Andrew "MIcrosoft Office Infopath 2003 Kick Starr", (Published by *Sams*) Print ISBN-10:0-672-32623-X , (Mar. 24, 2004), 1-57.
"Final Office Action", U.S. Appl. No. 10/916,692, (Nov. 16, 2009), 10 pages.
"Final Office Action", U.S. Appl. No. 11/072,087, (Nov. 16, 2009), 9 pages.

"Final Office Action", U.S. Appl. No. 11/218,149, (Nov. 16, 2009), 18 pages.
"Foreign Office Action", Mexican Patent Application No. PA/a/2006/002493, (Sep. 14, 2009), 5 pages.
"Non-Final Office Action", U.S. Appl. No. 11/036,910, (Nov. 13, 2009), 9 pages.
"Notice of Allowance", U.S. Appl. No. 10/942,528, (Dec. 3, 2009), 8 pages.
"Notice of Allowance", U.S. Appl. No. 10/955,665, (Nov. 3, 2009), 8 pages.
"Notice of Allowance", U.S. Appl. No. 11/095,254, (Nov. 18, 2009), 8 pages.
Van Hoff, Arthur et al., "The Open Software Description Format", Retrieved from: <www.w3.org/TR/NOTE-OSD> on May 18, 2009, (Aug. 13, 1997), 10 pages.
"Non Final OA", U.S. Appl. No. 10/939,588, (Feb. 18, 2009),40 pages.
"Notice of Allowance", U.S. Appl. No. 10/404,312, (Jan. 12, 2009),12 pages.
"Final Office Action", U.S. Appl. No. 10/857,689, (Jan. 6, 2009),23 pages.
"Non Final Office Action", U.S. Appl. No. 10/977,198, (Feb. 2, 2009),15 pages.
"Non Final Office Action", U.S. Appl. No. 10/939,588, (Feb. 18, 2009),40 pages.
"Non Final Office Action", U.S. Appl. No. 10/976,451, (Feb. 23, 2009),39 pages.
"Non final Office Action", U.S. Appl. No. 11/234,767, (Feb. 26, 2009),37 pages.
Kay, Michael "XSL Transfornmations (XSLT) Version 2.0", http://www.w3.org/TR/2005/WD-xslt20-20050404, (04/205),1-374.
"Notice of Allowance", U.S. Appl. No. 11/203,937,Supplemental, (Sep. 15, 2009),2 pages.
"Final Office Action", U.S. Appl. No. 10/942,528, (Sep. 17, 2009),27 pages.
"Non-Final Office Action", U.S. Appl. No. 11/107,347, (Sep. 17, 2009),9 pages.
"Notice of Allowance", U.S. Appl. No. 10/988,720, (Sep. 17, 2009),18 pages.
"Non-Final Office Action", U.S. Appl. No. 11/044,106, (Sep. 24, 2009),17 pages.
"Notice of Allowance", U.S. Appl. No. 11/203,937, (Aug. 31, 2009),2 pages.
"Non-Final Office Action", U.S. Appl. No. 11/567,149, (Sep. 8, 2009),5 pages.
"Final Office Action", U.S. Appl. No. 10/955,666, (Oct. 14, 2009),24 pages.
"Advisory Action", U.S. Appl. No. 10/942,528, (Oct. 26, 2009),3 pages.
"Non-Final Office Action", U.S. Appl. No. 11/557,931, (Oct. 20, 2009),27 pages.
"Non-Final Office Action", U.S. Appl. No. 10/976,451, (Oct. 29, 2009),14 pages.
Webopedia, "Definition of OLE", Retrieved from: <http://www.webopedia.com/TERM/O/OLE.html>, (May 16, 1998),3 pages.
Webopedia, "Definition of OpenDoc", Retrieved from: <http://www.webopedia.com/TERM/O/OpenDoc.html>, (Sep. 18, 1997),3 pages.
Webopedia, "Definition of Network", Retrieved from: <http://www.webopedia.com/TERM/n/network.html>, (Sep. 1, 1996),2 pages.
"Microsoft Word 2000 Screenshots", (2000),11-17.
XmlSpy, "XmlSpy 2004 Enterprise Edition Manual", Altova,(May 17, 2004),1-25, 220-225.
StylusStudio, "StylusStudio: XPath Tools", 2004-2007, StylusStudio,1-14.
Dodds, "Toward an XPath API", xml.com,(May 7, 2001),1-3.
Altova, "Altova Tools for XPath 1.0/2.0", Altova,1-12.
"Microsoft Word 2000 Screenshots", Word,(2000),1-17.

HU, et al., "A Programmable Editor for Developing Structured Documents based on Bidirectional Transformations", ACM,(Aug. 2004),178-179.
Bray, Tim "Extensible Markup Language (XML)", http://www.textuality.com/sgml-erb/WD-xml.html, second named inventor Jean Paoli, third named inventor C.M. Sperberg-McQueen,(Feb. 10, 1998),37 Pages.
"Final Office Action", U.S. Appl. No. 11/295,178, (Dec. 24, 2009), 38 pages.
"Non-Final Office Action", U.S. Appl. No. 10/402,640, (Dec. 30, 2009), 16 pages.
"Non-Final Office Action", U.S. Appl. No. 11/170,521, (Dec. 17, 2009), 11 pages.
"Non-Final Office Action", U.S. Appl. No. 11/218,149, (Jan. 14, 2010), 15 Pages.
"Non-Final Office Action", U.S. Appl. No. 12/021,894, (Dec. 31, 2009), 10 pages.
"Notice of Allowance", U.S. Appl. No. 10/955,665, (Dec. 30, 2009), 2 pages.
"Notice of Allowance", U.S. Appl. No. 10/990,152, (Dec. 21, 2009), 6 pages.
"Notice of Allowance", U.S. Appl. No. 11/056,500, (Dec. 2, 2009), 17 pages.
Honkala, Mikko et al., "Multimodal Interaction with XForms", ICWE '06, (2006), pp. 201-208.
Grosso, et al., "XML Fragment Interchange", W3C,(Feb. 2001),1-28.
Altova, et al., "User and Reference Manual Version 4.4", www.xmlspy.com, (May 24, 2007),1-565.
"XForm 1.0", W3C,(Jul. 16, 2001).
"Final Office Action", U.S. Appl. No. 12/126,532, (Oct. 14, 2011), 25 pages.
"Foreign Notice of Allowance", Canadian Application No. 2412611, (Sep. 19, 2011), 1 page.
"Foreign Notice of Allowance", Japanese Application No. 2002-504581, (Sep. 16, 2011), 6 pages.
"Foreign Office Action", Canadian Application No. 2408527, (Sep. 27, 2011), 3 pages.
"Foreign Office Action", Japanese Application No. 2002-503700, (Aug. 30, 2011), 4 pages.
"Notice of Allowance", U.S. Appl. No. 12/249,973, (Sep. 28, 2011), 9 pages.
"Adobe GoLive 5.0: User Guide," Adobe Systems, 2000, Chapter 12., (2000), 11 pages.
"Advisory Action", U.S. Appl. No. 11/036,910, (Sep. 10, 2009), 3 pages.
"European Search Report", EP Application No. 10012887.5, (Jul. 4, 2011), 12 pages.
"Extended European Search Report", EP Application No. 10012887.5, (Jul. 4, 2011), 11 pages.
"Foreign Office Action", Japanese Application No. 2002-504581, (Dec. 17, 2010), 24 pages.
"Foreign Office Action", Japanese Application No. 2002-504581, (May 27, 2011), 6 pages.
"Foreign Office Action", Japanese Application No. 2006-060050, (Aug. 26, 2011), 4 pages.
"Non Final Office Action", U.S. Appl. No. 11/036,910, (Oct. 2, 2008), 7 pages.
"Non-Final Office Action", U.S. Appl. No. 10/011,150, (May 19, 2005), 7 pages.
"Notice of Allowance", U.S. Appl. No. 10/011,150, (Dec. 16, 2005), 4 pages.
"Restriction Requirement", U.S. Appl. No. 10/011,150, (Dec. 15, 2004), 5 pages.
Zdonik, Stanley B., "Object Management System Concepts", *Supporting Integrated Office Workstation Applications, Doctoral Thesis, Massachusetts Institute of Technology*, (1983), 262 pages.

* cited by examiner

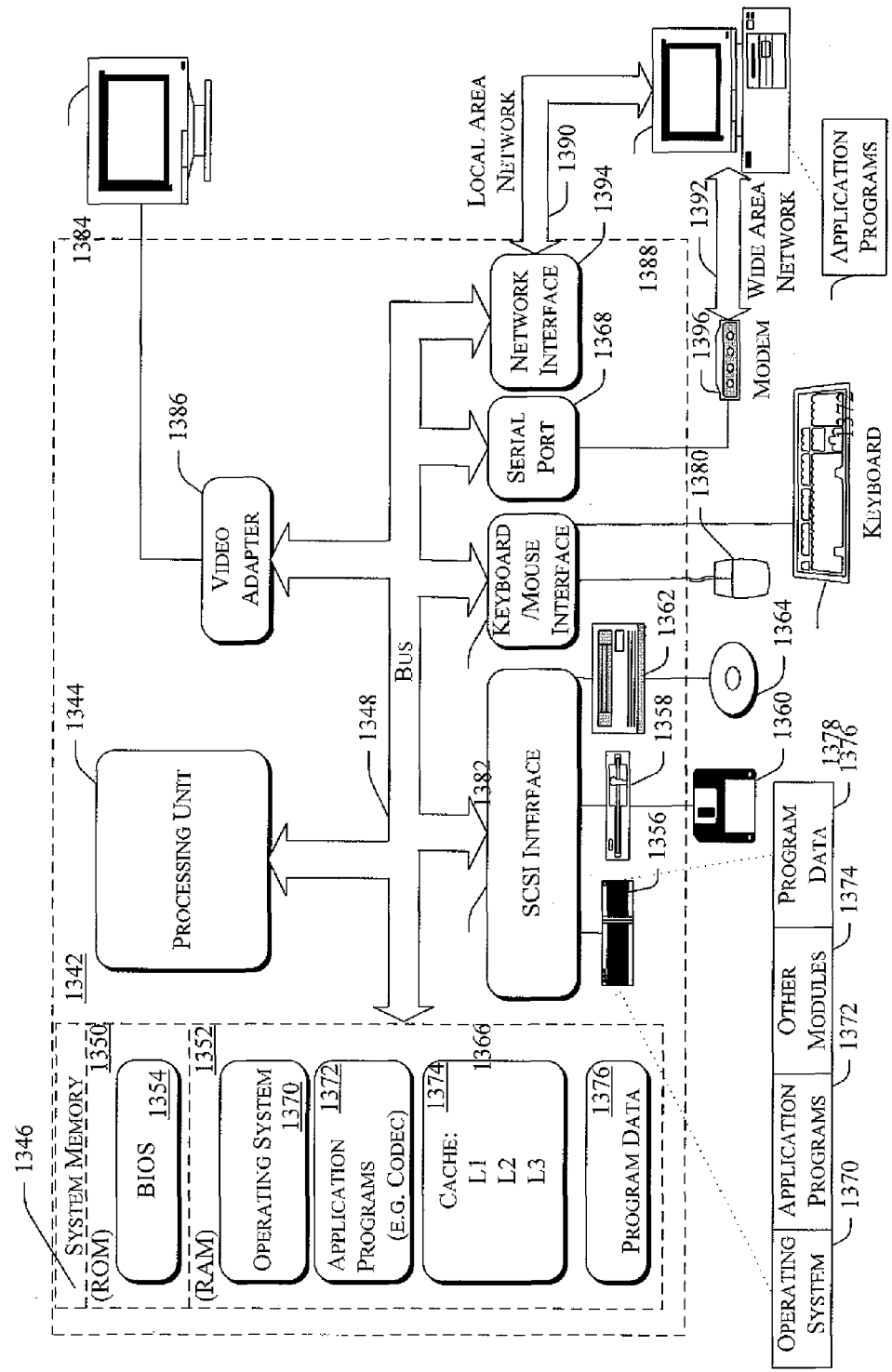

US 8,117,552 B2

INCREMENTALLY DESIGNING ELECTRONIC FORMS AND HIERARCHICAL SCHEMAS

RELATED APPLICATIONS

This application is a divisional of and claims priority to U.S. patent application Ser. No. 10/395,505, filed Mar. 24, 2003, the disclosure of which is incorporated by reference herein.

TECHNICAL FIELD

This invention relates to designing electronic forms and hierarchical schemas, and more particularly, to a user-friendly way to incrementally design electronic forms and hierarchical schemas.

BACKGROUND

Extensible markup language (XML) is increasingly becoming the preferred format for transferring information. XML is a tag-based hierarchical language that is extremely rich in terms of the information that it can be used to represent. For example, XML can be used to represent information spanning the spectrum from semi-structured information (such as one would find in a word processing document) to generally structured information (such as that which is contained in a table). XML is well-suited for many types of communication including business-to-business and client-to-server communication. For more information on XML, XSLT, and XML Schema, the reader is referred to the following documents which are the work of, and available from the W3C (World Wide Web consortium): XML 1.0 second edition specification; XSL Transformations (XSLT) Version 1.0; XML Schema Part 1: Structures; and XML Schema Part 2: Datatypes.

Before information can be transferred, however, it must first be collected. Electronic forms are commonly used to collect information. One way to collect information and have it also in an XML document is to have the electronic form correspond to an XML schema. By so doing, the information entered into an electronic form can be stored in an XML document, which conforms to the XML schema. Having information within an XML document that conforms to an XML schema allows the XML document to be understood and validated when transferred to others having access to the XML schema.

Currently, to begin creating an electronic form corresponding to an XML schema, a skilled programmer can write an XML schema and then, once the XML schema is written, abstract how information conforming to that schema will be entered. With the abstraction of how the information will be entered, the programmer can then create an electronic form that maps data-entry fields to that schema. The programmer can map data-entry fields to that schema using an XML path language (XPath), such as the W3C-standard XML path language (information about which is currently available from W3C at www.w3.org/TR/xpath). This process of creating an electronic form, however, is time consuming and can require a programmer of significant skill.

To create these electronic forms, the programmer often needs a significant understanding of HTML and XML Schemas. The programmer, to build an electronic form with even moderately complex data-entry fields-such as repeating data-entry fields—often needs to understand how these data-entry fields are represented in the schema, HTML file, and XML data file. Also, to build a relatively simple electronic form with simple data-entry fields the programmer often needs to understand how HTML, XML, and XML Schemas are structured and how they are interrelated. Thus, to build one of these electronic forms, a programmer often must have significant experience and skill.

For these reasons, creating electronic forms and corresponding schemas can be difficult, time consuming, and require a programmer of significant skill.

SUMMARY

In the following description and figures, a design application enabling a designer to incrementally build an electronic form and corresponding hierarchical schema is disclosed. This design application can also enable a designer to change an electronic form or corresponding hierarchical schema and simultaneously view the change in the electronic form and/or corresponding hierarchical schema.

In one implementation, the design application enables a designer to build an electronic form and corresponding hierarchical schema by incrementally building the electronic form and corresponding hierarchical schema using components.

In another implementation, the design application enables a designer to set the hierarchical nature of a hierarchical schema by the designer placing components in certain areas of a screen.

BRIEF DESCRIPTION OF THE DRAWINGS

FIG. 13 is a block diagram of a computer system that is capable of supporting an electronic-form and hierarchical-schema generation process.

The same numbers are used throughout the disclosure and figures to reference like components and features.

DETAILED DESCRIPTION

The following disclosure describes a user-friendly way to design electronic forms and corresponding hierarchical schemas using components and a form-designing area of a display. Components are presented in an area of a display screen, usually graphically, such as with an arrangement of icons. Icons representing each component are a simplification so that a designer can more easily understand the purpose of and choose from a list of components. A designer can choose each component that he or she wishes to include in an electronic form.

The designer can choose a component, such as by clicking on an icon representing a component, to be placed on a form-designing area. The form-designing area is presented in an area of a display screen, usually appearing as a blank page, such as is often done when viewing a new document in a word-processing application. Components placed in a form-designing area can be manipulated by a designer to allow the designer to make an electronic form look and feel like the designer desires. Parts of a hierarchical schema, called schema parts, correspond to the components in the form-design area, and can also be manipulated by the designer. This hierarchical schema can be represented as an XML file or as a data store. When represented as an XML file, a data store can also later be inferred from it.

With each new component added or modified, and in some cases each change made to an electronic form or hierarchical schema, the electronic form and corresponding hierarchical schema are altered to reflect that change. This incremental building of an electronic form and hierarchical schema, and the fact that they are linked so that a change to one can almost instantly be reflected in the other, allows a designer to quickly, easily, and intuitively create electronic forms and corresponding hierarchical schemas.

For discussion purposes, the visual representation of the components, hierarchical schema, and electronic form are described in the context of a single computer, a set of user-input devices, and a single display screen having areas for displaying a representation of the components, the electronic form, and the hierarchical schema. The display screen, computer, and user-input devices will be described first, followed by a discussion of the techniques in which these and other devices can be used.

System Architecture

Figure 1:
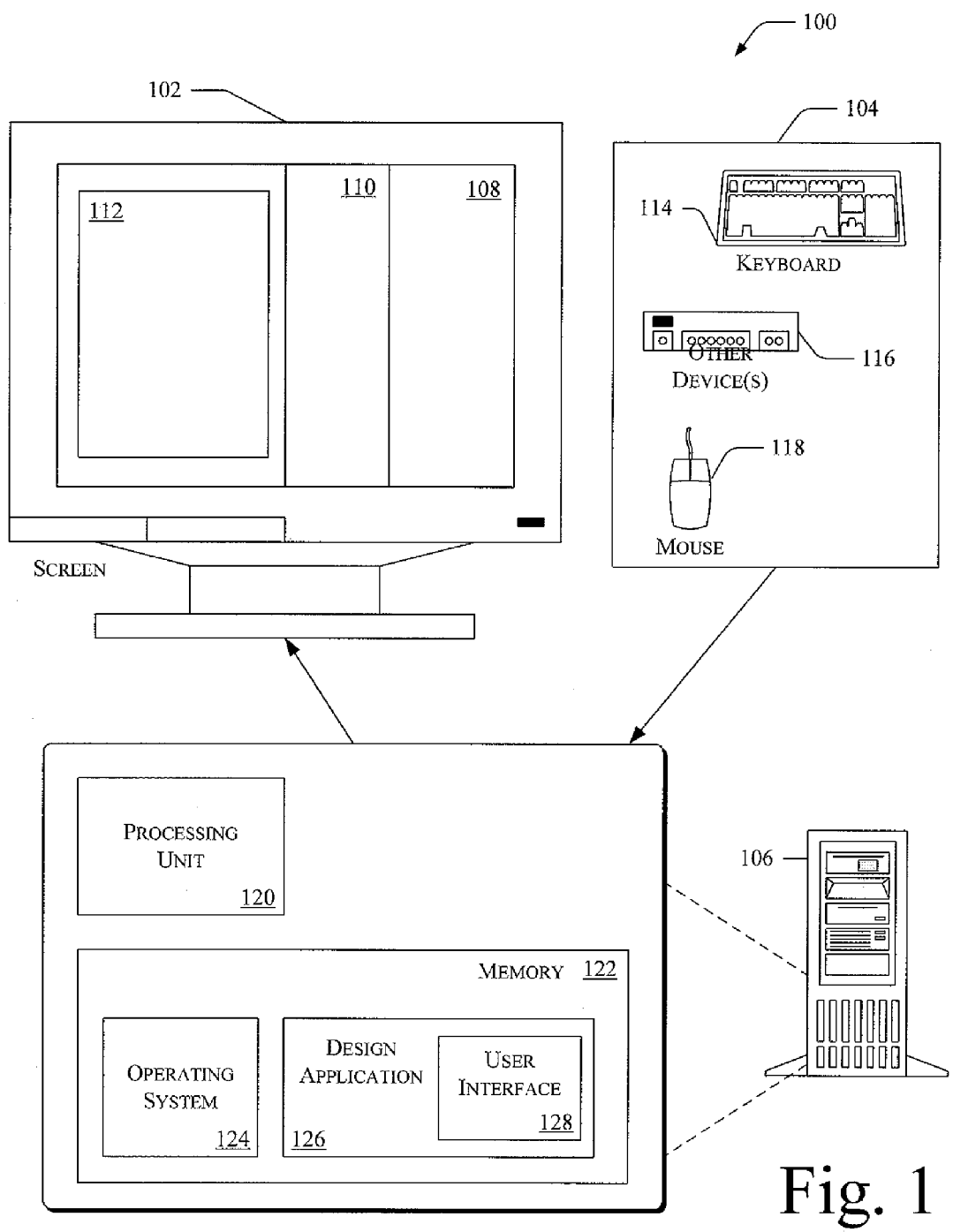
FIG. 1 illustrates a system with a display screen, computer, and user-input devices. The system implements a method for designing electronic forms.

FIG. 1 shows an exemplary implementation of various devices and an application that can be used to facilitate the creation of electronic forms from a list of components.

FIG. 1 shows an exemplary system 100, which includes a screen 102, user-input devices 104, and a computer 106.

The user-input devices 104 can include any device allowing a computer to receive a designer's preferences, such as a keyboard 114, other device(s) 116, and a mouse 118. The other input devices 116 can include a touch screen, a voice-activated input device, a track ball, and any other device that allows the system 100 to receive input from a designer. The computer 106 includes a processing unit 120 and random access memory and/or read-only memory 122 including applications, such as an operating system 124 and a form and a design application 126, which includes a user interface 128. The computer 106 communicates with a designer through the screen 102 and the user-input devices 104.

The screen 102 includes three displays or screen areas: a hierarchical schema display area 108; a component display area 110; and a form-design area 112. With these areas, a designer can see a representation of and select a component from a list of components. He can also see a representation of the component in an electronic form and schema parts corresponding to the component in a representation of the hierarchical schema.

Figure 2:
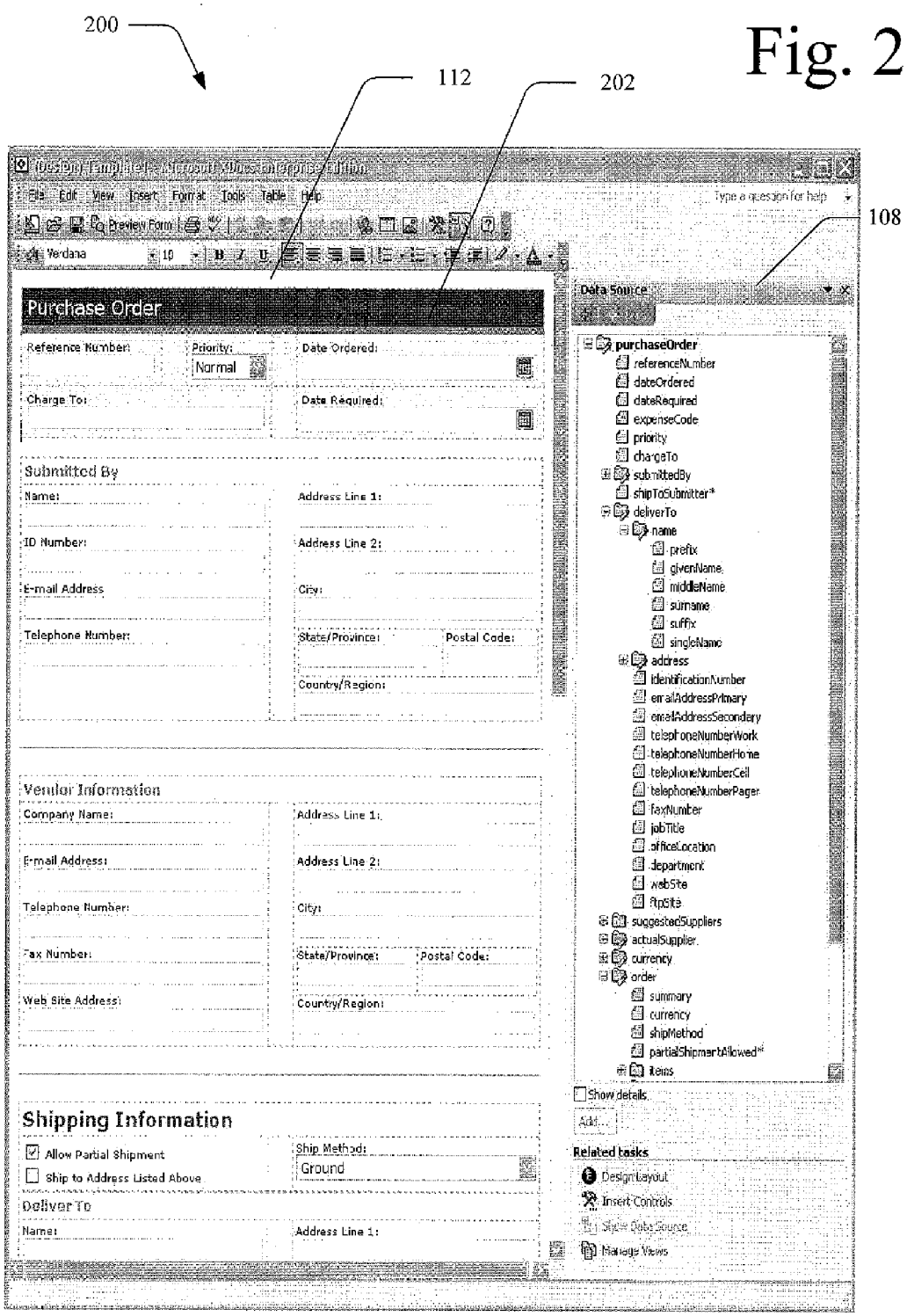
FIG. 2 illustrates an exemplary screen display showing a hierarchical schema display area and an electronic form in the form-design area being designed with a method for designing electronic forms.

FIG. 2 shows an exemplary design screen 200, including an example of the form-design area 112 and the hierarchical schema display area 108 (entitled "Data Source"). Partially within the form-design area 112 is a design view of an electronic form 202. The electronic form 202 is a design view because it is in the process of being constructed and so can include information for the designer not intended for viewing by a data entry user. This electronic form 202 is being built from components chosen by a designer. The components chosen create the data-entry fields shown in the electronic form 202. These data-entry fields correspond to parts of a hierarchical schema, the parts being shown through the icons displayed in the hierarchical schema display area 108. The icons displayed are a representation of part of a file of hierarchical schema arranged into a tree structure.

Figure 3:
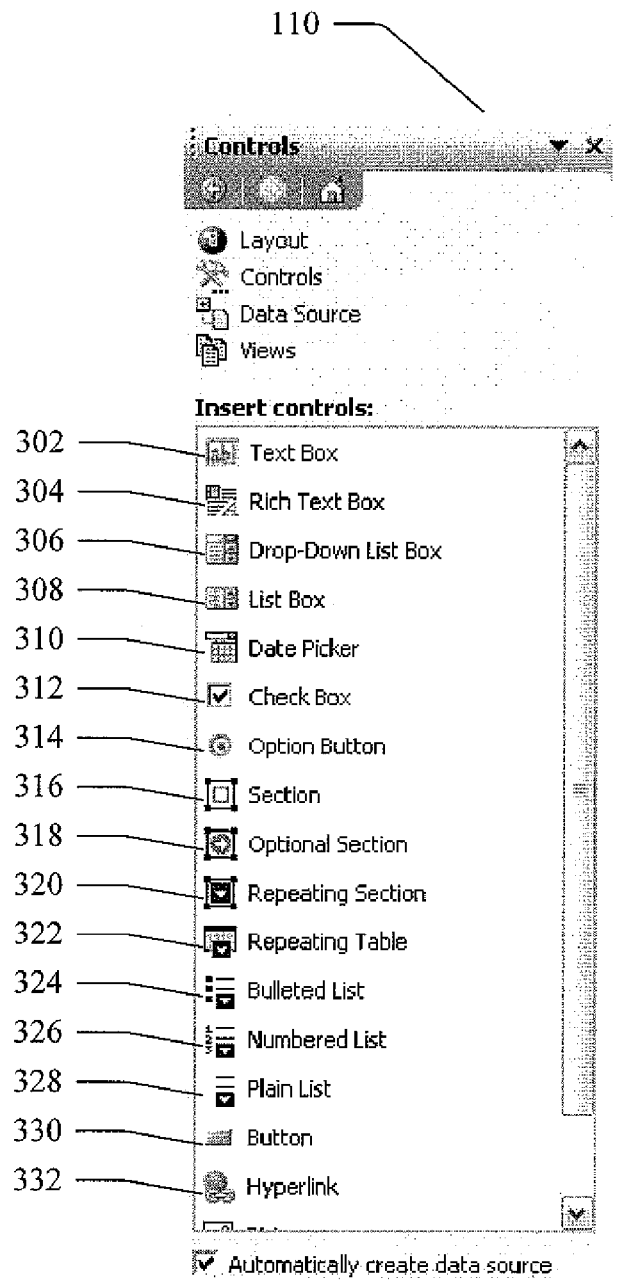
FIG. 3 illustrates an exemplary component display area.

FIG. 3 shows an example of components from which a designer can choose, which are displayed here at the component display area 110. These various components include a text box 302, a rich text box 304, a drop-down list box 306, a list box 308, a date picker 310, a check box 312, an option button 314, a section 316, an optional section 318, a repeating section 320, a repeating table 322, a bulleted list 324, a numbered list 326, a plain list 328, a button 330, and hyperlink 332. Other components can be included as well. As described in further detail below, each of these components represents a data-entry field that can be added to an electronic form.

With the listed components and other components the system 100 enables a designer to build a hierarchical schema and an electronic form with many different types of components, allowing for many different possible types of data-entry fields, such as the electronic form 202 in the form-design area 112 of FIG. 2. The process used to build an electronic form and hierarchical schema from components will be set forth in greater detail below.

The above devices and applications are merely representative, and other known devices and applications may be substituted for or added to those shown in FIG. 1. One example of another known device that can be substituted for those shown in FIG. 1 is the device shown in FIG. 13. Other examples include portable, handheld, or wireless devices.

Techniques for Building Forms and Hierarchical Schemas

Overview

A system, such as the system 100 of FIG. 1, displays components to a designer. The designer can choose from the components to graphically and easily build an electronic form and a corresponding hierarchical schema. The system 100 can also incrementally build an electronic form and hierarchical schema with each new component the designer adds, which allows the designer to see the electronic form and/or hierarchical schema grow with each new component chosen. The designer may also change components existing in the electronic form, the change to each being incrementally reflected by the system 100.

Figure 4:
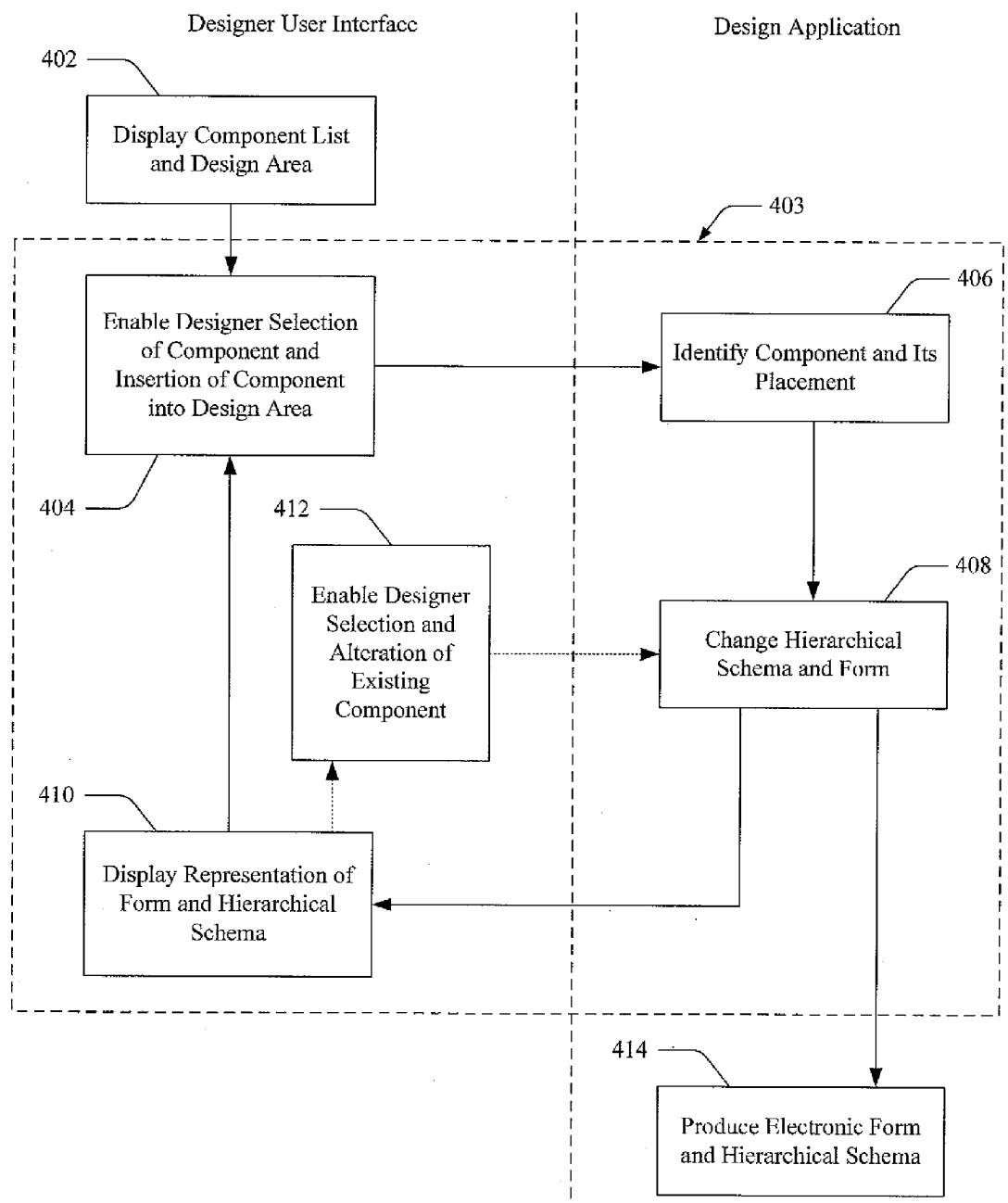
FIG. 4 is a flow diagram of an exemplary process for generating electronic forms and hierarchical schemas.

FIG. 4 shows a process 400 for generating an electronic form and a corresponding hierarchical schema. The process 400 is illustrated as a series of blocks representing individual operations or acts performed by the system 100. The process 400 may be implemented in any suitable hardware, software, firmware, or combination thereof. In the case of software and firmware, the process 400 represents a set of operations implemented as computer-executable instructions stored in the memory 122 and executable by the processing unit 120.

Displaying Components and Form-Design Area

At block 402, the user interface 128 displays components and a form-design area. It does so to enable a designer to graphically design an electronic form.

Figure 5:
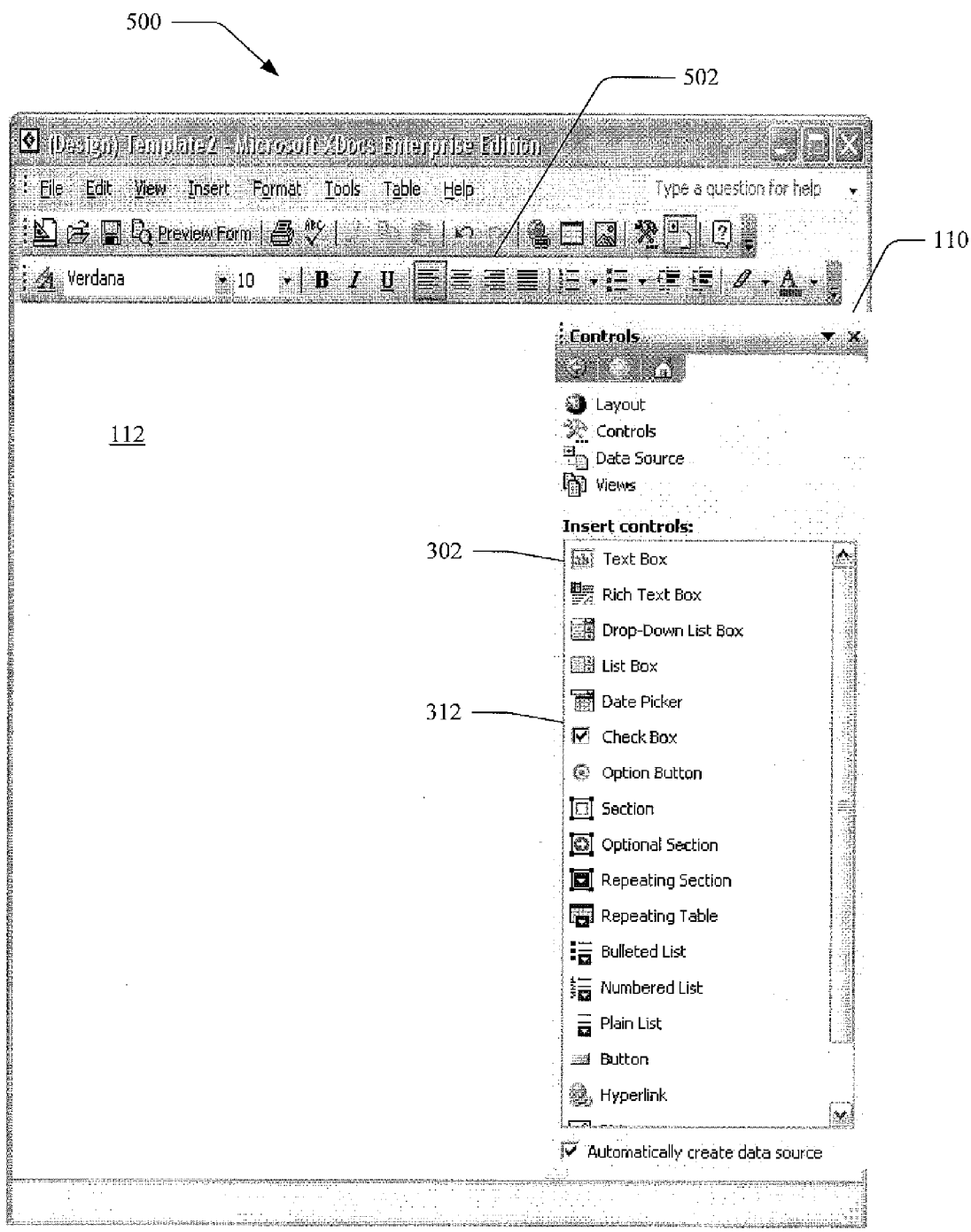
FIG. 5 illustrates an exemplary screen display showing a component display area and a blank form-design area.

FIG. 5 shows a design screen 500 created by the user interface 128, having an example of the component display area 110 and a blank example of the form-design area 112. The form-design area 112 is displayed to make it easy for a designer without typical programming skills to create an electronic form and corresponding hierarchical schema.

To make it easy, the user interface 128 can provide an editing experience to a designer similar to that commonly provided in word-processing systems. The user interface 128 can, for instance, work like a word-processing system by providing similar font controls and options. In FIG. 5, for example, the user interface 128 displays the form-design area 112 looking like a page from a word-processing application, here a blank, white page. It can also display commonly used icons that represent operations that a designer can choose to perform, such as the font being used (in FIG. 5, Verdana, size 10), bold/underline/italic options, and the like. These word-processing icons can be displayed in many different ways, including as shown in a word-processing icon display 502 of FIG. 5.

Also, as stated elsewhere herein, changes made by the designer to the form-design area 112 can be reflected in the form-design area 112 instantaneously (from the perspective of the designer), further making the design process similar to a typical word-processing experience. By so doing, the user interface 128 makes designing an electronic form simpler and more intuitive for a person skilled in word-processing.

The components are displayed by the user interface 128 in the component display area 110 to make it easy for a designer without extensive knowledge of components to be able to understand what each of them can represent in an electronic form. To show what each component represents, the user interface 128 displays icons and/or text to inform the designer, such as with the icons and text set forth in the component display area 110 set forth in FIGS. 3 and 5. In FIG. 3, for example, the text box 302 includes an icon (i.e., a symbol) and text describing what a text box component represents. This icon shows a designer that, should be choose to include a text box component in his electronic form, he will have a data-entry field in which a user of the electronic form will be permitted to input text. Likewise, the text describing the text box 302 ("Text Box") is also descriptive.

With the component display area 110 and the form-design area 112 displayed, the designer can begin to build an electronic form and corresponding hierarchical schema. He can continue to build the electronic form and hierarchical schema by adding components, but can also alter the electronic form and hierarchical schema by altering existing components. This process of building and altering is shown as a design sub-process 403, which includes blocks 404 to 412. The sub-process 403 includes blocks used to describe the action and interaction of the designer and the system 100. When the designer has finished with the electronic form and hierarchical schema, the design application 126 produces the resulting electronic form and hierarchical schema (block 414). The process 403 and the block 414 will be described in greater detail below.

When the component display area 110 and the form-design area 112 are presented, the designer can pick a component from the list of components in the component display area 110 for insertion into the form-design area 112 (block 404). The designer can pick from components in various ways, including through the mouse 118, the other devices 116 (such as a touch screen, track ball, voice-activation, and the like), and through the keyboard 114, which are shown in FIG. 1. To grant flexibility to the designer, the system 100 enables the designer to move the component in the form-design area 112 to where she desires.

A designer can pick a component, for example, by dragging and dropping (from the component display area 116) a component's icon onto a form-design area 112 shown in FIG. 5. The designer can pick a component to drag and drop with various devices, such as with the mouse 118 or commands entered through the keyboard 114. In FIG. 5, the designer clicks on the icon and text for the text box 302 to select it.

How an icon for a component looks may not exactly indicate how it will look in an electronic form, as icons are too small to be exact. Rather, icons are designed to indicate the look and/or function of the data-entry fields that choosing the component will create.

Figure 6:
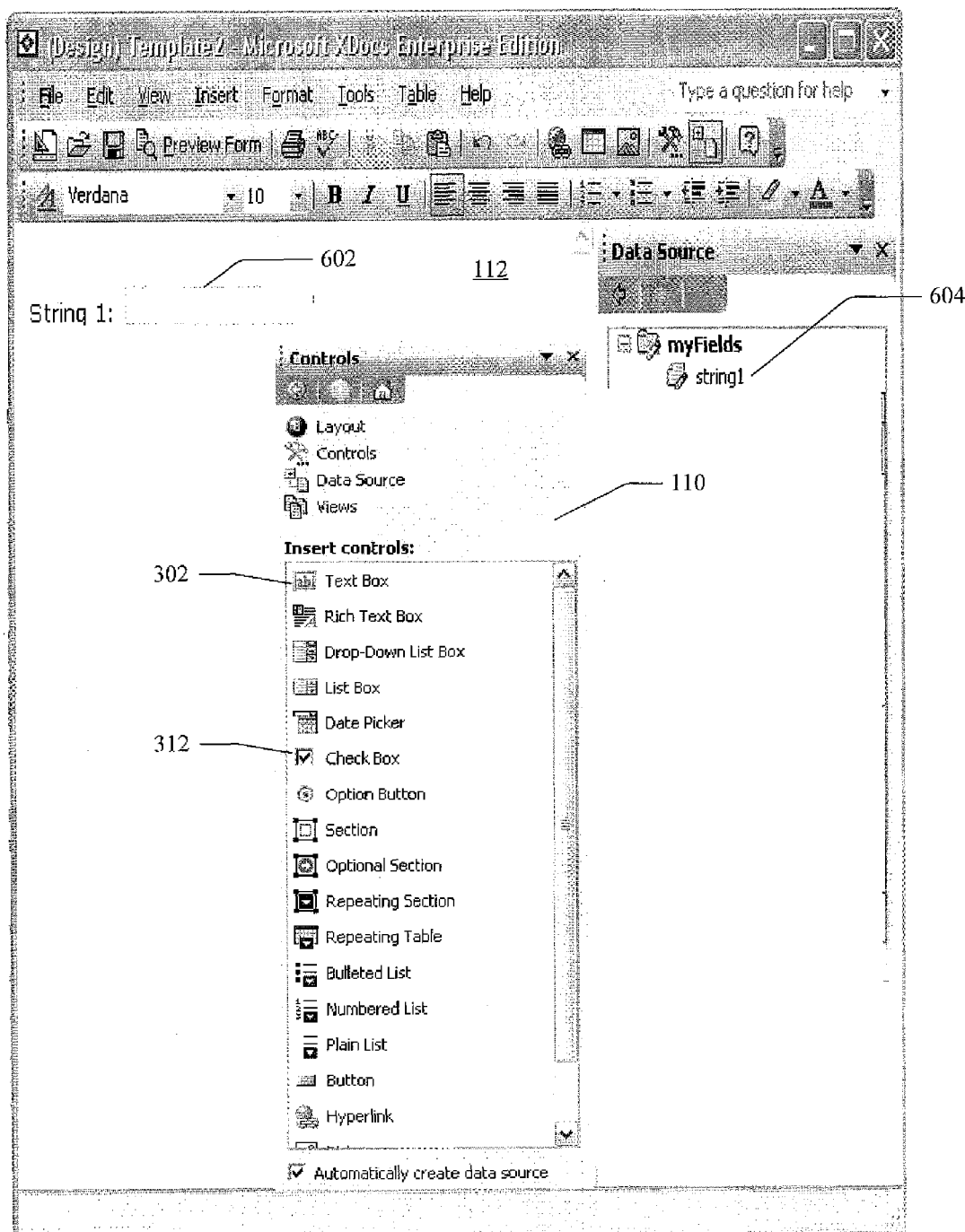
FIG. 6 illustrates an exemplary screen display showing part of a hierarchical schema display area, a component display area, and a form-design area.

FIG. 6 shows an exemplary screen display 600 showing what the design application 126 creates after a designer selects the text box 302 in FIG. 5 (also shown in FIG. 6). In this example, the system 100 creates a text box data-entry field 602 which looks like a gray box for entry of text and is labeled "String 1:", in response to the designer's selection. The design application 126 enables the designer to continue building his electronic form by selecting components, thereby creating data-entry fields.

Building an Electronic Form and Hierarchical Schema

Once the system 100 receives a selection of a component and the placement for the component, the system 100 can identify which component was selected, identify the placement for that component on the form-design area 112, build a hierarchical schema and electronic form based on the component chosen and its location, display the electronic form and/or the hierarchical schema, and, when the designer is finished, produce the resulting electronic form and hierarchical schema. These tasks are set forth in blocks 406, 408, 410, and 414 of FIG. 4, which will be described below.

In block 406, the design application 126 identifies which component was selected. The system 100 can access and/or contain many components, either from local or remote sources. Some of these components are set forth (via icons and text) in the component display area 110 shown in FIGS. 3, 5, 6, and 7.

Also in the block 406, the design application 126 identifies where a component is placed in the form-design area 112. The placement of the component can alter the structure of a corresponding hierarchical schema. How the placement of a component can alter the hierarchical schema's structure will be set forth in greater detail below.

If, for example, a designer chooses the text box 302 from the component display area 110 of FIG. 5, and places the text box 302 in the upper left corner of the form-design area 112, the design application 126 will identify the component and its placement. In this example, the design application 126 will identify that the component chosen was the text box 302 and the placement was a particular spot in the upper left corner of the form-design area 112. With this information, the system 100 proceeds to build the electronic form and hierarchical schema, which will be described in part using FIGS. 5 and 6.

In block 408, the design application 126 changes an electronic form and corresponding hierarchical schema based on a component selected. When a component is added, as has been described in part above, the design application 126 changes the hierarchical schema and electronic form by building in the added component. When an existing component is altered (discussed in greater detail below), the design application 126 changes the electronic form and hierarchical schema to reflect that alteration.

The structure of each component placed into the form-design area 112 is reflected in a corresponding hierarchical schema. The structure or code added to the hierarchical schema for each component selected is called a schema part. Each schema part governs the information added (such as by a data-entry user of the electronic form built by the design application 126) into each data-entry field in an electronic form that corresponds to the same component for which the schema part corresponds. A check box component's schema part, for instance, allows only the following values: true, false, 0, or 1 (by default).

Thus, a hierarchical schema governs how information is handled that is input into an electronic form for which it corresponds. Because a hierarchical schema includes the structure of each component chosen, the structure of each chosen component affects the structure of the hierarchical schema. For example, the following components, when added to an electronic form, will add a schema part (when using an XML Schema) having the following code to a hierarchical schema corresponding to the electronic form:

| Component name | Schema Part's Code |
|---|---|
| Text Box | `<element name="field#" type="string"/>` |
| Rich Text Box | `<element name="field#">`<br>  `<complexType mixed="true">`<br>    `<sequence>`<br>      `<any minOccurs="0" maxOccurs="unbounded" namespace="http://www.w3.org/1999/xhtml" processContents="lax" />`<br>    `</sequence>`<br>  `</complexType>`<br>`</element>` |
| Check Box | `<element name="field#" type="boolean"/>` |
| List Box | `<element name="field#" type="string"/>` |
| Drop-Down List Box | `<element name="field#" type="string"/>` |
| Option Button | `<element name="field#" type="string"/>` |
| Date Picker | `<element name="field#" type="date"/>` |
| Picture (linked) | `<element name="field#" type="anyURI"/>` |
| Picture (inline) | `<element name="field#" type="base64Binary"/>` |
| List (plain, numbered, or bulleted) | `<element name="group#">`<br>  `<complexType>`<br>    `<sequence>`<br>      `<element name="field#" type="string" maxOccurs="unbounded"/>`<br>    `</sequence>`<br>  `</complexType>`<br>`</element>` |
| Section, and Optional Section | `<element name="group#">`<br>  `<complexType>`<br>    `<!-- EMPTY CONTAINER -->`<br>  `</complexType>`<br>`</element>` |
| Repeating Section | `<element name="group#">`<br>  `<complexType>`<br>    `<sequence>`<br>      `<element name="group#" maxOccurs="unbounded">`<br>        `<complexType>`<br>          `<!-- EMPTY CONTAINER -->`<br>        `</complexType>`<br>      `</element>`<br>    `</sequence>`<br>  `</complexType>`<br>`</element>` |
| Repeating Table | `<element name="group#">`<br>  `<complexType>`<br>    `<element name="group#" maxOccurs="unbounded">`<br>      `<complexType>`<br>        `<sequence>`<br>          `<element name="field#" type="string"/>`<br>          `<element name="field#" type="string"/>`<br>          `<element name="field#" type="string"/>`<br>          `<!-- Etc. for each column -->`<br>        `</sequence>`<br>      `</complexType>`<br>    `</element>`<br>  `</complexType>`<br>`</element>`<br>Note: The number of columns is used to determine the number of "field#"s added. |
| Button, Expression Box, Hyperlink | None |

Note that all of the above "element" elements also have the attribute value "minOccurs=0", but it has been omitted for clarity. Also note that the pound sign (#) represents a number to make each element name unique. For example: field1, field2, and field3.

For the above example, when a component is added to the form-design screen 112, the system 100 will generate a hierarchical schema with a schema part including the above code.

Likewise, each component built into an electronic form governs how the component is displayed and information within it handled. Each component built into an electronic form, for instance, governs the look, display, orientation, and size of data-entry field(s), as well as how and where information entered into these data-entry field(s) is mapped, including to a document governed by a corresponding hierarchical schema.

The set of components available for building the electronic form can be extensible. A developer, by specifying the criteria above (for instance, the look, display, orientation, whether it allows nested components, and so forth) can create a new component that a designer can use to build an electronic form. A developer-created component, like the pre-existing components, can have an appropriate associated schema part from which to build a corresponding hierarchical schema.

Once the system 100 changes the hierarchical schema and electronic form (block 408), it proceeds to block 410 to display the electronic form and hierarchical schema, or to block 414, to complete the process and produce the electronic form and hierarchical schema. Block 410 will be discussed first below, followed later by a discussion of block 414.

In the block 410, the user interface 128 displays the electronic form and/or hierarchical schema. Hierarchical schemas can be represented in various ways, including by visually showing the hierarchical structure of the hierarchical schema. One example of this is the indentations of the hierarchical schema set forth in the hierarchical schema display area 108 of FIG. 2.

Electronic forms can be displayed (to a designer or user) through various techniques, including by transforming the hierarchical schema or its data file into an electronic form. In one implementation, the system 100 creates a display for an electronic form by applying an application written in a transformation language onto a hierarchical schema or its data file written in a machine language. This creates a rendering language document written in a rendering language which can be used to create the display. By way of example, the transformation language can include CSS or XSLT, the machine language XML, and the rendering language HTML or XHTML.

Electronic forms can be represented in various ways. The user interface 128 can display a design view of an electronic form to a designer to make it easy for a designer to understand the structure of the electronic form, or can show the electronic form without additional information. A design view of an electronic form can mimic the electronic form that will be seen by a user, such as set forth in form-design area 112 of FIG. 2. The design view can show components built into an electronic form with additional information showing details about the data-entry field or fields corresponding to the components to aid a designer in understanding the components in the electronic form and altering the electronic form.

The user interface 128 can also display the electronic form and hierarchical schema in order for the designer to assess the electronic form and hierarchical schema after each change made by the designer. When the designer can quickly see the effect of his changes, the designer can more easily build an electronic form and hierarchical schema matching the designer's intended results. Once the electronic form is displayed, such as in the form-design area 112, and the hierarchical schema is displayed (if desired) in the hierarchical schema display area 108, the designer can continue to make changes or end the process. Ending the process will be discussed as part of the block 414, described below.

Whether the user interface 128 displays the electronic form or the electronic form and hierarchical schema, the display should show changes made by a designer, such as adding a data-entry field and schema part by selecting and/or inserting a new component.

Continuing the example above (where a designer chooses the text box 302 from the component display area 110 of FIG. 5 and places the text box 302 in the upper left corner of the form-design area 112), the design application 126 will build an electronic form and hierarchical schema based on the identity and placement of the component. Using the exemplary code set forth above, the design application 126 can build a hierarchical schema with a schema part including the code: <element name="string1" type="string"/>. This code can be displayed on the screen 102, but because most designers are more comfortable with a graphical display, the schema part can be displayed as an icon and text, such as with a schema part string1 604 of FIG. 6.

Also in this example, the design application 126 builds an electronic form with a text box component and displays it as set forth in FIG. 6, with a text box data-entry field 602 in the form-design area 112.

One of the advantages of the design application 126, and the method it employs, is that the electronic form and hierarchical schema can be built incrementally. That is to say, with each component chosen, or in some implementations with each other action taken that will affect the construction of the electronic form and hierarchical schema, the electronic form and hierarchical schema are altered. This incrementalism allows a designer to quickly see how the electronic form and hierarchical schema are changing with each change made by the designer. The designer does not have to work on either a form or a schema and then save the form or schema to see how the corresponding schema or form looks or performs. Instead, as the designer makes a change, it is reflected in the electronic form and hierarchical schema. This makes designing an electronic form and hierarchical schema easy and intuitive.

In one implementation, the design application 126 can reflect each change made by a designer to both the electronic form and hierarchical schema so quickly that the designer sees it in real time, regardless of whether the change was made to the electronic form by altering the form-design area 112 or to the hierarchical schema by altering the hierarchical schema display area 110. By so doing, the designer can more easily design electronic forms and hierarchical schemas.

Once a component has been added (or altered, discussed below), the design application 126 displays the form and hierarchical schema as set forth above. With the new change shown, the design application 126 continues to enable the designer to add components to the electronic form, returning to block 404, or alter an existing component, block 412.

If the designer chooses to add another component, the design application 126 enables him to do so in a manner similar to picking the first component as described above. The electronic form 202 of FIG. 2 is one such example of an electronic form built from many components.

Figure 7:
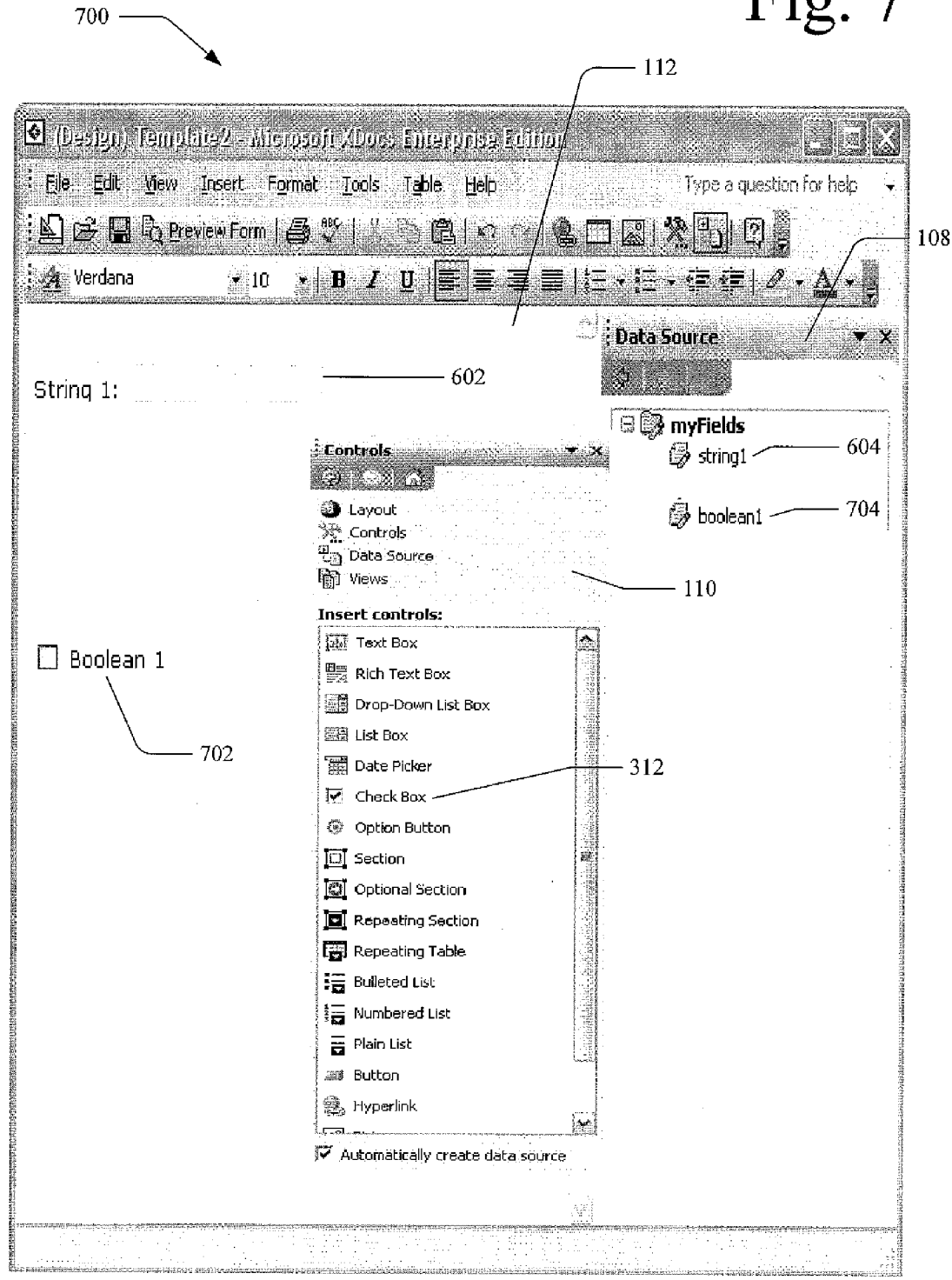
FIG. 7 illustrates an exemplary screen display showing part of a hierarchical schema display area, a component display area, and a form-design area.

FIG. 7 shows an exemplary screen display 700 showing the continued building of an electronic form. Here, the designer chose another component (the check box 312 of FIG. 6) to add to the electronic form and hierarchical schema shown in FIG. 6. In response to the designer's choice, the design application 126 added a Boolean box 702. As shown in the screen display 700, the Boolean box 702 looks like a small check box (which can be filled with a check mark or left empty by a user) and is labeled "Boolean 1". Also in response to the designer's choice, the design application 126 altered the hierarchical schema to include a Boolean schema part 704 (labeled "boolean1") corresponding to the Boolean box 702.

Figure 8:
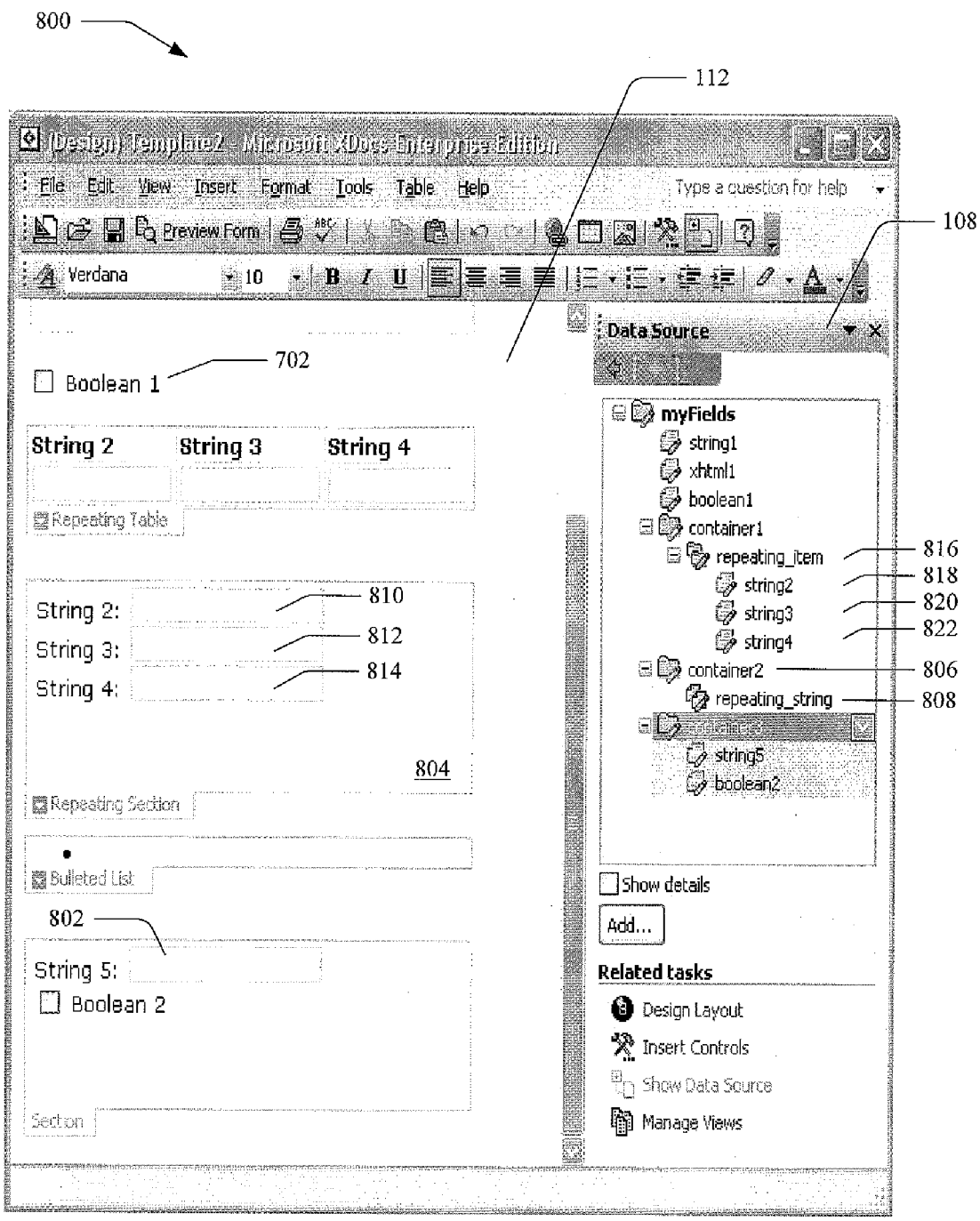
FIG. 8 illustrates an exemplary screen display showing a hierarchical schema display area and a form-design area.

FIG. 8 shows an exemplary design screen 800 showing the continued building of an electronic form. The design screen 800 shows the electronic form and hierarchical schema from FIGS. 6 and 7, and the results of the designer continuing to choose components. Through this process of adding components to the form-design area 112, a designer can build everything from a simple electronic form, such as shown in FIG. 6, to a moderately complex form, such as shown FIG. 8, to a large, complex form, such as shown in FIG. 2. As the design application 126 builds an electronic form, it builds a corresponding hierarchical schema. FIG. 2 shows an example of a hierarchical schema, displayed in hierarchical schema display area 108 of FIG. 2, corresponding to an electronic form, in this case the electronic form 202 of FIG. 2.

A designer can simply make a change, like adding a component, to the electronic form or hierarchical schema and see the change applied to both the electronic form and hierarchical schema. In this sense, the electronic form and hierarchical schema are actively linked. This active linkage makes designing and changing electronic forms and hierarchical schemas quicker, easier, and more intuitive.

The design application 126 links the electronic form and the hierarchical schema by mapping each component within an electronic form to each schema part in the corresponding hierarchical schema. In one implementation, the design application 126 maps them with XPath pointers.

In the block 412, the design application 126 enables a designer to select and alter existing components included in an electronic form and hierarchical schema. The design application 126 allows the designer to intuitively and easily alter the electronic form and hierarchical schema, such as by including editing tools familiar to designers that know word-processing techniques. A designer can change a component stylistically (such as the font, color, size, and the like) and structurally (such as by changing a text box to a Boolean box, and whether or to which other components the component governs or is subordinate). A designer can make these changes also by altering how a component (such as one displayed as a data-entry field) is represented on an electronic form. For example, a designer can click on a component on the form-design screen 112, change the style, move it, delete it, and the like. As the designer makes changes, the design application 126 alters the hierarchical schema to continue to correspond to the altering electronic form.

FIG. 8 shows the exemplary design screen 800, which provides a design view of an electronic form and its corresponding hierarchical schema, shown in the design area 112 and the hierarchical schema display area 108, respectively. To enable the designer to make changes to a component, the design application 126 (through the user interface 128) enables the designer to click on components displayed in the design view of the electronic form. One such component, a text box data-entry field 802 (labeled "String 5"), is shown as an example. Once the designer selects a component, in this example the text box data-entry field 802, the design application 126 provides the designer with multiple options to change the data-entry field. As seen in a design screen 900 (described below), the design application 126 provides options in a way comfortable to a designer familiar with common word-processing techniques and icons. If the designer clicked on the text box data-entry field 802 of FIG. 8, the design application 126 can provide multiple pop-up menus of options for the designer.

Figure 9:
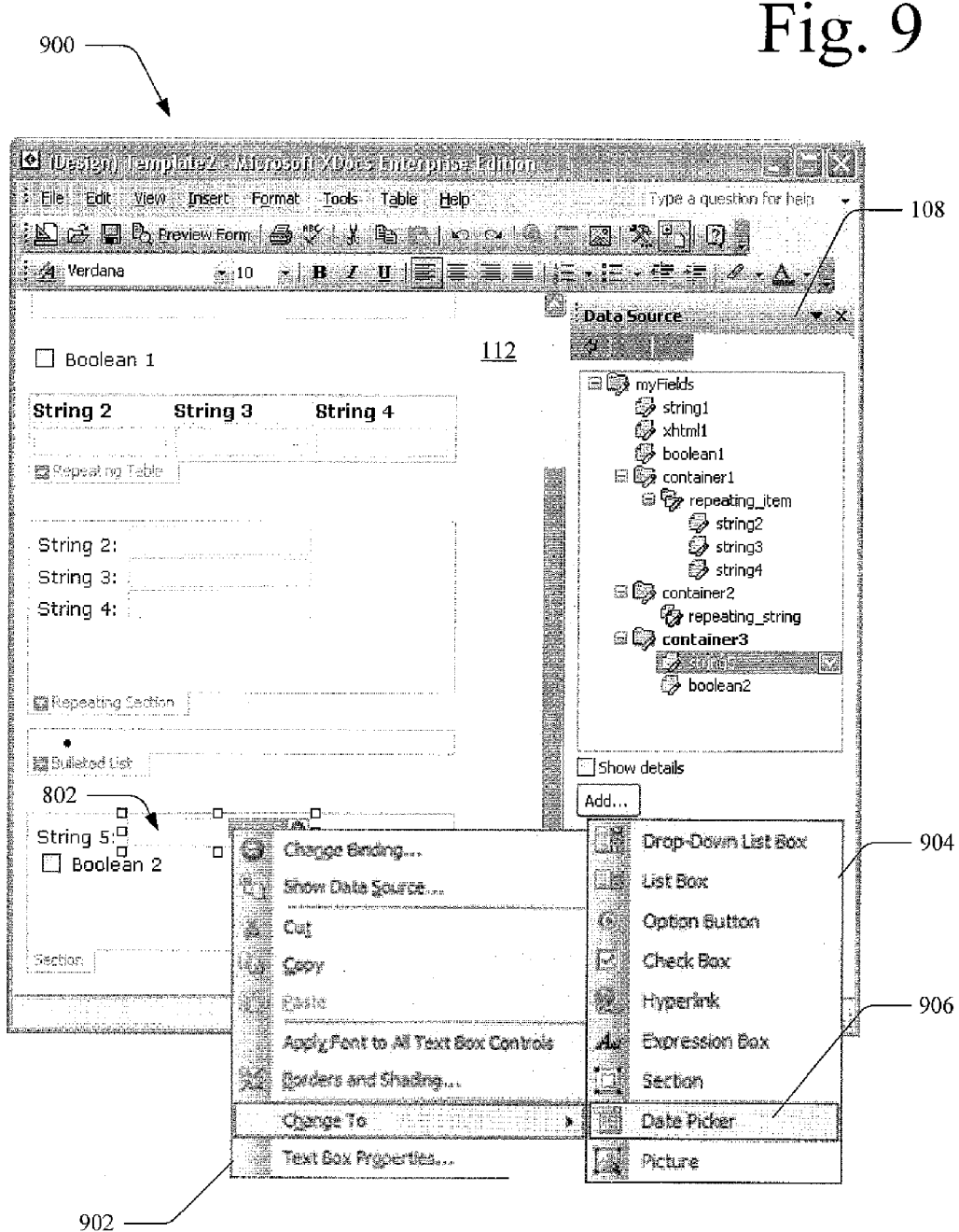
FIG. 9 illustrates an exemplary screen display showing a hierarchical schema display area, a form-design area, a component context menu, and a structure submenu.

FIG. 9 sets forth the exemplary design screen 900 including multiple ways in which the design application 126 provides options for a designer. These include a component context menu 902 and a structure submenu 904. In this example, the design application 126 enables the designer to change the electronic form and hierarchical schema by changing a representation of a component in the form-design area 112 (such as a data-entry field or accompanying graphics and text). Also, the design application 126 enables the designer to cut the component and move it (through selection and deleting or dragging the component), and change its font, borders, shading, and other style changes (through the component context menu 902), as well as change its structure (through the structure submenu 904). In this example, the designer changes the component by changing the structure of a data-entry field corresponding to the component (the text box data-entry field 802) into a date picker data-entry field by selecting a date picker component 906.

Also in the block 412, the design application 126 enables a designer to alter a schema part directly through selecting it from a hierarchical schema. It can do so by allowing the designer to change an electronic form indirectly by making a change to the hierarchical schema. The design application 126 enables this because, while many designers may prefer to build an electronic form and hierarchical schema by changing an electronic form through a form-design screen, such as the design screen 112, some designers will be familiar and comfortable enough with hierarchical schemas to change them through a representative display of the hierarchical schema, such as the hierarchical schema display area 108. In this way, the designer can alter or add schema parts in the hierarchical schema, which may be associated with components reflected in the electronic form. Once the designer has made a change, the design application 126 changes the electronic form and hierarchical schema to reflect the alteration (block 408).

Figure 10:
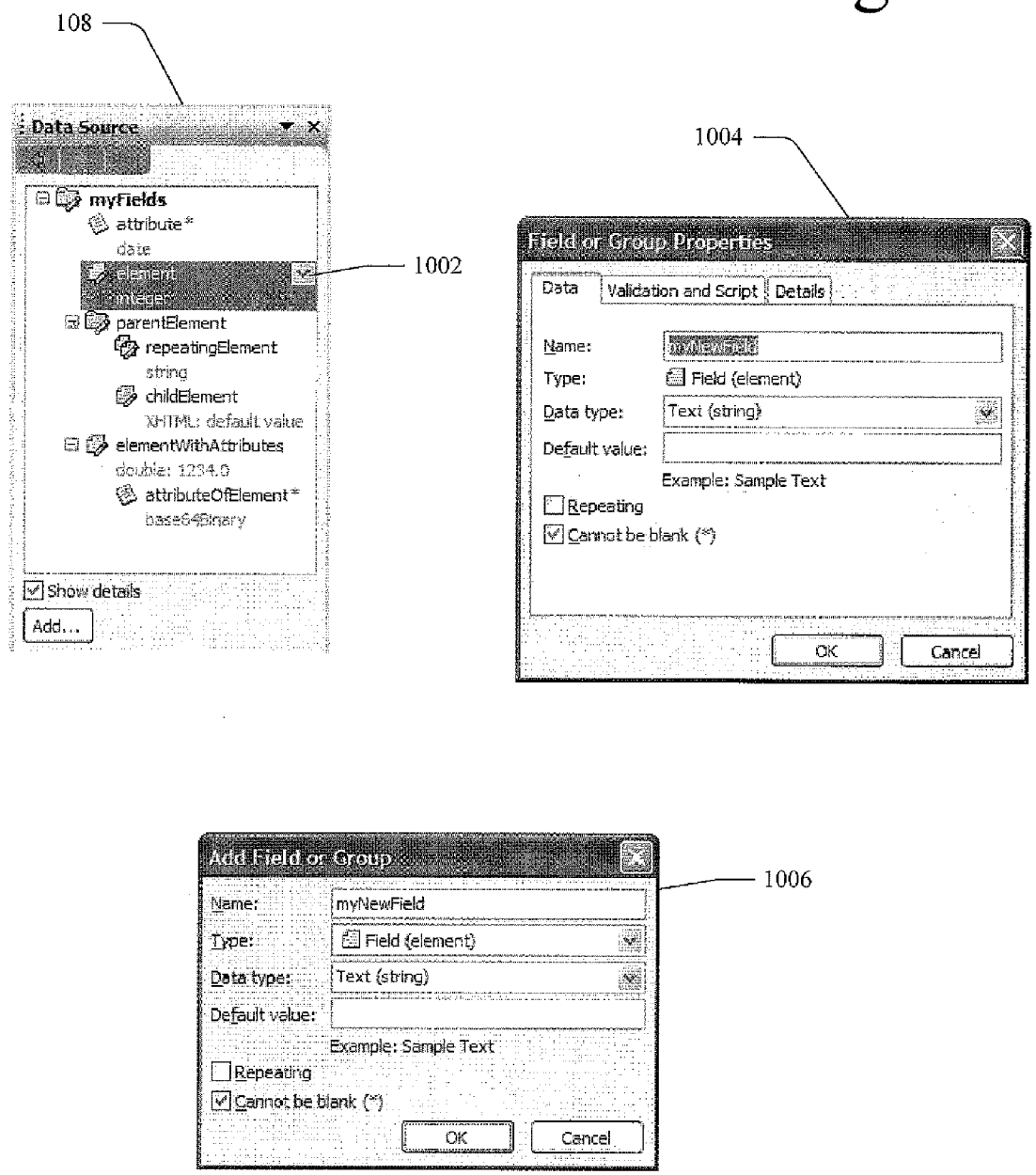
FIG. 10 illustrates an exemplary hierarchical schema display area, a change inquiry window and an add window.

FIG. 10 shows an example of the hierarchical schema display area 108, and how it can be used by a designer to alter a hierarchical schema. In this example, a designer selected a schema part entitled "element" (an element 1002). Once chosen, the design application 126 prompts the designer, asking for information, such as through a change inquiry window 1004. Using the window 1004, the design application 126 enables the designer to make various changes to the element 1002. He can change, for instance, the data type and default value allowed for the element 1002 and its corresponding data-entry field in an electronic form.

Also as part of this example, the design application 126 presents the designer with the current name, type, and data type of a selected schema part. The designer can then make changes by altering these current parameters of the selected schema part, such as set forth in the change inquiry window 1004 by changing the name to "myNewField" from "element" and the data type to "Text (string)" from "Whole Number (integer)". The design application 126 also enables the designer to make other changes to a schema part, such as whether or not it repeats, has a default value, or can be blank.

Also as part of the block 412, the design application 126 allows a designer to alter components by adding to, deleting from, or otherwise changing schema parts (whether they are schema parts governing or subordinate to other schema parts or otherwise).

FIG. 10 shows an example of a pop-up window with which the design application 126 can enable a designer to alter schema parts. With an alter window 1006, the designer can add or delete aspects of a schema part, set a default value of the schema part, name the schema part, make it repeating or not, and establish whether or not it is allowed to be blank. In addition to these data parameters, the design application 126 can enable the designer to make other changes to a schema part, such as to how it is validated, its script, and other details.

As part of enabling the designer to makes these changes, the design application 126 makes appropriate changes to the structure of the hierarchical schema and electronic form. If the designer deletes a component, for instance, the design application 126 may delete the code corresponding to the component from the hierarchical schema and the electronic form.

Assume, for example, that the designer chose to delete a repeating section 804 from the electronic form shown in the design screen 800 of FIG. 8. With this selection made, the design application 126 deletes a "repeating_item" schema part 816 and its subordinate string hierarchical schema parts 818, 820, and 822 (entitled "string2", "string3", and "string4") from the hierarchical schema. To do so the design application 126 deletes the following code from the hierarchical schema:

```
<element name="repeating_item">
    <complexType>
        <sequence>
            <element name="string2" type="string"/>
            <element name="string3" type="string"/>
            <element name="string4" type="string"/>
        </complexType>
        </element>
    </sequence>
    </complexType>
</element>
```

Subsequent to this deletion, the design application 126 deletes the component from the electronic form. In this example, the design application 126 deletes the repeating section 804 and its subordinate repeating string data-entry fields: a repeating string data-entry field 810 (labeled "String 2:"); a repeating string data-entry field 812 (labeled "String 3:"); and a repeating string data-entry field 814 (labeled "String 4:"). This deletion can be shown immediately in the design view of the electronic form in the design screen 800 by the design application 126. By immediately showing the deletion in the electronic form and the hierarchical schema, the design application 126 and the user interface 128 enable the designer to more easily and quickly customize the form to fit his or her preferences.

According to block 414, when finished, the end product is an electronic form and a corresponding hierarchical schema. The electronic form created can be a transformation-language document, and can be written in CSS, XSLT, or otherwise. Hierarchical schemas corresponding to these electronic forms can also be written in various languages, which will be described in greater detail below.

One example of an electronic form created by the design application 126 is the purchase order electronic form 202 viewed in the form-design area 112 of FIG. 2. This electronic form 202, once finished and presented to an end user, can be used by that user to key in information into data-entry fields. After entry of information, the information can be stored in a markup-language document, such as one written in XML. The information stored can conform to a hierarchical schema corresponding to the electronic form, thereby allowing easy use and/or transfer of information stored in the markup-language document. The hierarchical schema to which the markup-language document conforms can be written in various languages, including schemas written to govern markup languages (such as XML). Schemas governing XML documents are commonly called XML Schemas, DTD (Document Type Definition) schemas, and XDR (XML-Data Reduced) schemas.

Thus, a designer not knowledgeable about transformation-language documents (like an electronic form written in CSS), hierarchical schemas, or programming can, easily and with no specialized skills, create an electronic form and corresponding hierarchical schema.

The design application 126 can even create electronic forms that are XSLT transformation-language documents, which is especially complex, and corresponding hierarchical schemas that are XML schemas. In this case, a designer having little knowledge about the XSLT language can create, using XSLT transformation-language components as an example, an electronic form that is an XSLT transformation-language document and a corresponding hierarchical schema which is a schema capable of governing XML documents, such as XML Schema.

The hierarchical schema can be written in many languages, follow various standards, or be a set of tables in a database. Hierarchical schemas can do more than a linear or flat list; they can include, for example, a schema part that governs or contains another schema part that corresponds to a component of a different type than that of the governing schema part. Thus, these types of schemas can allow for a governing schema part to correspond to a text box component, for instance, and at the same time govern a Boolean component.

Hierarchical schemas can govern many different documents. Because of this, an electronic form relating to a hierarchical schema can have thousands of different users keying information into thousands of different documents, all of which can be governed by the one hierarchical schema.

Building a Hierarchical Schema

The system 100 enables a designer to incrementally build an electronic form and corresponding hierarchical schema.

Because the concept of structuring data hierarchically can be difficult for designers to grasp easily and readily, but many users readily understand structuring information spatially, the design application 126 can enable users to incrementally create spatially structured electronic forms. These electronic forms are incrementally converted into hierarchically structured schemas, thus making it easier for a designer to create electronic forms that take advantage of hierarchically structured data.

The hierarchical aspect of the hierarchical schema allows it to correspond to many different types of structures and components in an electronic form. A designer can, for instance, build an electronic form with various structures, like repeating tables and lists. These repeating tables and lists are well suited to a hierarchical schema because of its hierarchical aspect.

A hierarchical schema is structured; in other words, some schema parts may be governed or affected by other schema parts. With the exception of every schema part's subordination to the root schema part, which governs all other schema parts, each schema part may or may not be subordinate to another schema part. In the hierarchical schema display area 108 of FIG. 2 for instance, the root schema part is the schema part labeled "PurchaseOrder". The next six schema parts, "referenceNumber" to "chargeTo", are subordinate to (or governed by) only the root schema part, "PurchaseOrder". Conversely, the six schema parts labeled "prefix" to "singleName" are also governed by the schema part labeled "deliveryTo".

The design application 126 can build a hierarchical schema hierarchically. It can do so by receiving instructions from a designer as to how to build the hierarchical schema, including how to arrange each schema part as subordinate to or governing another. A designer can, for instance, instruct the design application 126 to make a particular component subordinate to or govern other components. A designer can also instruct the design application 126 to make a particular schema part subordinate to or govern other schema parts. In either case, the design application 126 can build a hierarchical schema and electronic form based on how components or schema parts govern or are subordinate to other components or schema parts. By enabling a designer to give the design application 126 instructions in various ways, including typed-in instructions, clicking on icons, and dragging and dropping icons for schema parts or components, the designer's experience can be made easy and intuitive.

Some of the ways the design application 126 can receive instructions as to how to build an electronic form and hierarchical schema hierarchically can include ways in which a designer will not need to know how or even that a hierarchical schema is being built. Many designers may not understand hierarchical schemas, or may just want to build a hierarchical schema (and, typically, an electronic form) in an easy, graphical, and intuitive manner.

Figure 11:
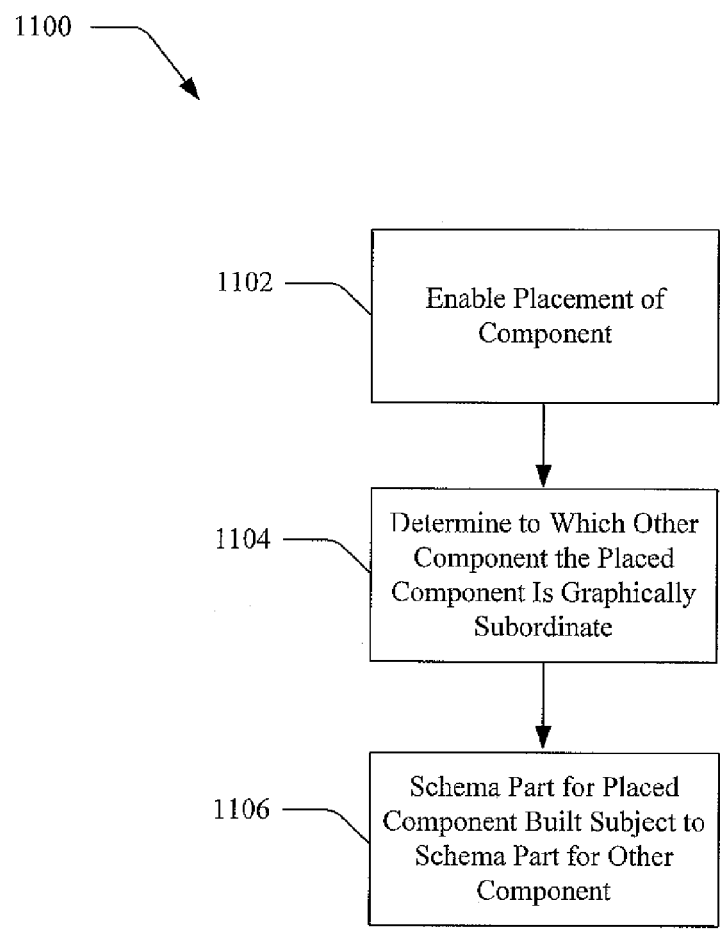
FIG. 11 is a flow diagram of an exemplary process for building a hierarchical schema.

FIG. 11 shows a process 1100 by which the design application 126 enables a designer to give instructions graphically and, using the instructions, determine a governance or subordination of schema parts in a hierarchical schema. As set forth in block 1102, the design application 126 enables a designer to give instructions graphically. In this way, a designer can give instructions (like placing a component in a particular location of the form-design area 112) to the design application 126 from which it can infer how the designer wishes a hierarchical schema to be built.

The design application 126 enables a designer to input his or her preference for a component to be subordinate and/or governing, such as by placing a component's icon or a mouse-pointer beneath, below, within, or otherwise relative to another, existing component (whether when first placed or later moved). To aid the designer to give the designer's intended input to the design application 126, it enables a designer to see how each component is governed by or subordinate to other components. The design application 126, in one implementation, displays subordination areas to graphically indicate which components govern or are subordinate to others. Some of these components inherently contain other components, and so are shown with subordination areas containing data-entry fields in the display area 112; some are altered by the designer to contain other components.

Figure 12:
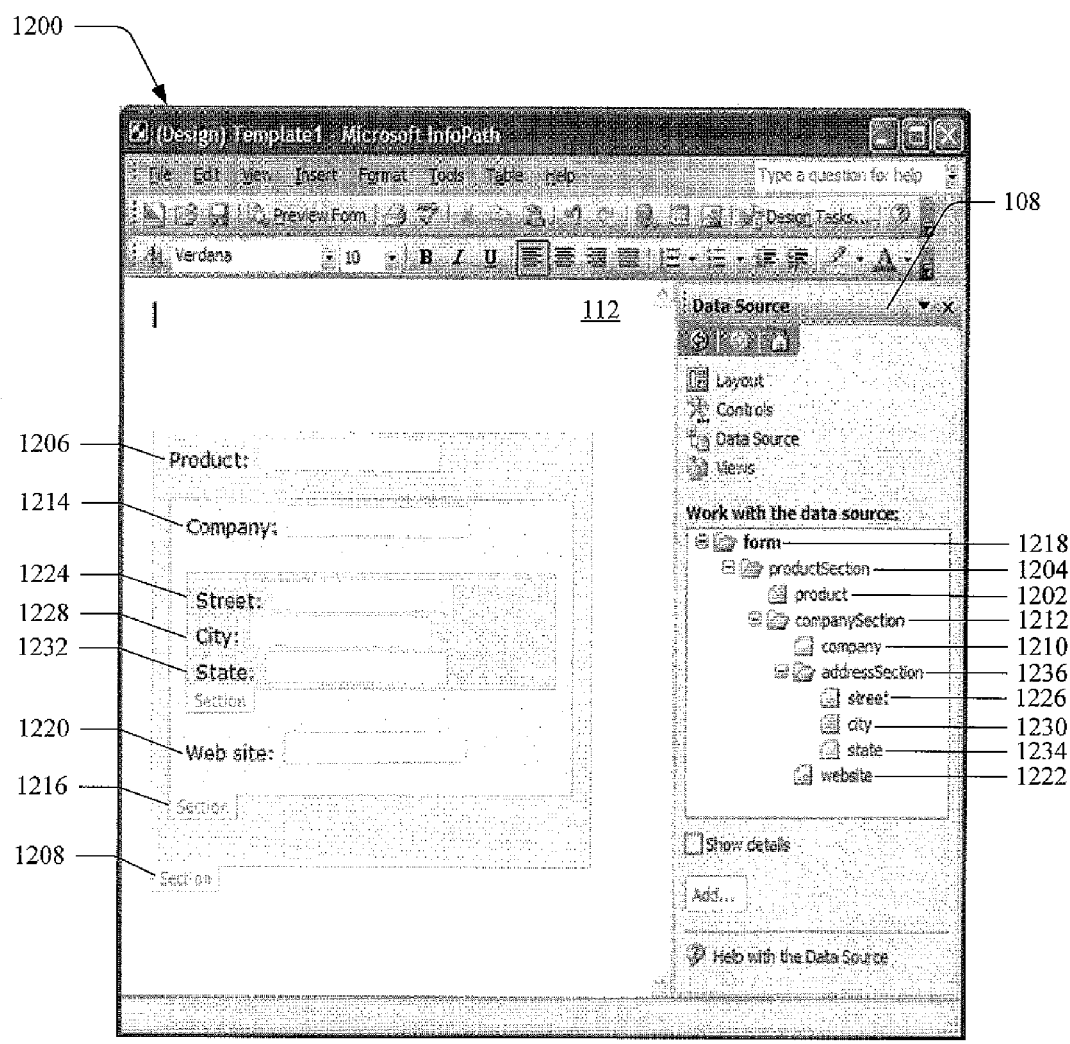
FIG. 12 illustrates an exemplary screen display showing a hierarchical schema display area and a form-design area.

In FIG. 12, for example, an exemplary design screen 1200 shows how the design application 126 can enable a designer to place components subordinate to and/or governing other components by placing them in particular places in the design screen 1200, FIG. 12 shows subordination areas marked by boxes, into which a designer can place a component to be subordinate to another component. If the designer places a component outside all subordination areas, the component will be governed by only the root schema part. These subordination areas show components as subordinate or governing in the electronic form and hierarchical schema.

In this example, a product schema part 1202 is shown to be subordinate governed by) the "productSection" schema part 1204 by the product schema part's 1202 corresponding product component 1206 being within a productSection box 1208 marked with a tab entitled "Section". Also in this example, a company schema part 1210 is shown to be governed by a companySection schema part 1212 and the productSection schema part 1204 by the company schema part's 210 company component 1214 being within a companySection box 1216 marked with a tab entitled "Section".

Thus, the company schema part 1210 is governed by two schema parts (1212 and 1204) as well as the root schema part 1218 entitled "form". Continuing this example, a website component 1220 and its schema part 1222 are shown to be governed by the companySection schema part 1212 (through the component being within the companySection box 1216), the productSection schema part 1204, and the root schema part 1218. Likewise, a street component 1224 and its schema part 1226, a city component 1228 and its schema part 1230 and a state component 1232 and its schema part 1234 are shown to be governed by an addressSection schema part 1236, the companySection schema part 1212, the productSection schema part 1204, and the root schema part 1218.

Thus, the design application 126 can show a designer which components govern or are subordinate to other components. Similarly, the design application 126 can infer, in some implementations, which components govern or are subordinate to other components based upon where a component is placed by a designer relative to another component, such as by a designer placing a component within a subordination area, e.g., the product section box 1208.

At block 1104, the design application 126 determines to which other component(s) a placed or moved component is graphically subordinate. It can determine, for example, that the company component 1214 and the website component 1220 are subordinate to the companySection schema part 1212 through being within the companySection box 1216. With this determination, the design application 126 builds the hierarchical schema to represent this subordination (block 1106). The design application 126 can determine this incrementally, such as when a component is added or moved into a subordination area.

The design application 126 adds or rearranges schema parts to represent each component's relationship to the other components. Continuing the above example, for the relationship between the components in the form-design area 112 of FIG. 12, the design application 126 builds a hierarchical schema that corresponds to the form-design area 112, set forth in the hierarchical schema display area 108, also of FIG. 12. The hierarchical schema display area 108, for example, includes the root schema part 1218, though no corresponding component/box is shown in the form-design area 112.

The hierarchical schema displayed in hierarchical schema display area 108 includes schema parts corresponding to components and reflecting the relationships between the components in the form-design area 112. It shows here that the product schema part 1202 and the website schema part 1222 correspond to the product component 1206 and the website component 1220. The hierarchical schema display area 108 shows that these components and their corresponding schema parts (1202 and 1222) are subordinate to schema parts 1204 and 1218.

The design application 126 builds this hierarchical structure into the hierarchical schema by subordinating schema parts to other schema parts. Lastly, the design application 126 can build the hierarchical schema to show that schema parts are subordinate to other parts by being placed to the right of those schema parts.

The example set forth in FIG. 12 shows various types of components and schema parts, but is not intended to limit the abilities of the design application 126, the user interface 128, or the system 100; other types of components and ways to present them can be used.

A Computer System

FIG. 13 shows an exemplary computer system that can be used to implement the processes described herein. Computer 1342 includes one or more processors or processing units 1344, a system memory 1346, and a bus 1348 that couples various system components including the system memory 1346 to processors 1344. The bus 1348 represents one or more of any of several types of bus structures, including a memory bus or memory controller, a peripheral bus, an accelerated graphics port, and a processor or local bus using any of a variety of bus architectures. The system memory 1346 includes read only memory (ROM) 1350 and random access memory (RAM) 1352. A basic input/output system (BIOS) 1354, containing the basic routines that help to transfer information between elements within computer 1342, such as during start-up, is stored in ROM 1350.

Computer 1342 further includes a hard disk drive 1356 for reading from and writing to a hard disk (not shown), a magnetic disk drive 1358 for reading from and writing to a removable magnetic disk 1360, and an optical disk drive 1362 for reading from or writing to a removable optical disk 1364 such as a CD ROM or other optical media. The hard disk drive 1356, magnetic disk drive 1358, and optical disk drive 1362 are connected to the bus 1348 by an SCSI interface 1366 or some other appropriate interface. The drives and their associated computer-readable media provide nonvolatile storage of computer-readable instructions, data structures, program modules and other data for computer 1342. Although the exemplary environment described herein employs a hard disk, a removable magnetic disk 1360 and a removable optical disk 1364, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1356, magnetic disk 1360, optical disk 1364, ROM 1350, or RAM 1352, including an operating system 1370, one or more application programs 1372 (such as a design application), other program modules 1374, and program data 1376. A user may enter commands and information into computer 1342 through input devices such as a keyboard 1378 and a pointing device 1380. Other input devices (not shown) may include a microphone, joystick, game pad, satellite dish, scanner, or the like. These and other input devices are connected to the processing unit 1344 through an interface 1382 that is coupled to the bus 1348. A monitor 1384 or other type of display device is also connected to the bus 1348 via an interface, such as a video adapter 1386. In addition to the monitor, personal computers typically include other peripheral output devices (not shown) such as speakers and printers.

Computer 1342 commonly operates in a networked environment using logical connections to one or more remote computers, such as a remote computer 1388. The remote computer 1388 may be another personal computer, a server, a router, a network PC, a peer device or other common network node, and typically includes many or all of the elements described above relative to computer 1342. The logical connections depicted in FIG. 13 include a local area network (LAN) 1390 and a wide area network (WAN) 1392. Such networking environments are commonplace in offices, enterprise-wide computer networks, intranets, and the Internet.

When used in a LAN networking environment, computer 1342 is connected to the local network through a network interface or adapter 1394. When used in a WAN networking environment, computer 1342 typically includes a modem 1396 or other means for establishing communications over the wide area network 1392, such as the Internet. The modem 1396, which may be internal or external, is connected to the bus 1348 via a serial port interface 1368. In a networked environment, program modules depicted relative to the personal computer 1342, or portions thereof, may be stored in the remote memory storage device. It will be appreciated that the network connections shown are exemplary and other means of establishing a communications link between the computers may be used.

Generally, the data processors of computer 1342 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein includes these and other various types of computer-readable storage media when such media contain instructions or programs for implementing the blocks described, in conjunction with a microprocessor or other data processor. The system described can also include the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described system and method enables a designer to easily and incrementally create electronic forms and corresponding hierarchical schemas, even if the designer has only basic skills. The above-described system and method also allows a designer to create, with the click of a mouse, electronic forms written in XSLT and hierarchical schemas written in XML Schema. In addition, the above system and method enables a designer to view changes he is making in real-time to an electronic form and hierarchical schema. Although the system and method has been described in language specific to structural features and/or methodological acts, it is to be understood that the system and method defined in the appended claims is not necessarily limited to the specific features or acts described. Rather, the specific features and acts are disclosed as exemplary forms of implementing the claimed system and method.

The invention claimed is:

1. A method comprising:
    displaying an electronic form in a form-design area, the electronic form including an existing component, the existing component having a data-entry field;
    displaying, in a hierarchical schema display area, a first representation of a hierarchical schema, the hierarchical schema corresponding to the electronic form and having XML code;
    receiving an input through a graphical user interface to add a new component at a location in the form-design area;
    responsive to receiving the input:
        inferring as follows:
            if the location is within a subordination area of the existing component, that the new component is subordinate to the existing component;

if the location is below the existing component, that the new component is subordinate to the existing component; or if the location is above the existing component, that the new component governs the existing component;

incrementally changing both XSLT code used to display the electronic form and the hierarchical schema to reflect the received new component, the incrementally changing as follows:

if the location is below the existing component, as being subordinate to the existing component and altering an existing XML schema part associated with the existing component to include, as subordinate, a new schema part associated with the new component-to be subordinate to the existing XML schema part;

if the location is within the subordination area, as being subordinate to the existing component and altering the existing XML schema part associated with the existing component to include, as subordinate, the new schema part associated with the new component to be subordinate to the existing XML schema part; or if the location is above the existing component, as governing the existing component and altering the existing XML schema part associated with the existing component to to be subordinate to the new schema part; and displaying, in the hierarchical schema display area, a second representation of the hierarchical schema, the second representation showing as follows:

if the location is below the existing component, the new schema part associated with the new component to be subordinate to the existing XML schema part;

if the location is within the subordination area of the existing component, the new schema part associated with the new component to be subordinate to the existing XML schema part; or if the location is above the existing component, altering the existing XML schema part to be subordinate to the new schema part.

2. The method of claim 1, further comprising receiving a second input to alter a style of the existing component or the new component and incrementally changing the style of the existing component or the new component in the form-design area.

3. The method of claim 1, further comprising receiving a second input to alter the existing component or the new component by moving the existing component or the new component within the form-design area and incrementally changing responsive to only the moving of the existing component or the new component.

4. The method of claim 3, wherein the act of incrementally changing responsive to only the moving of the existing component or the new component makes the existing component or the new component subordinate to another component in the electronic form.

5. The method of claim 1, wherein incrementally changing is performed in part by linking the electronic form and the corresponding hierarchical schema.

6. The method of claim 1, wherein the input is received through a selection made to a screen in which a list of one or more components is provided.

7. The method of claim 1, wherein the input is received through a selection made to the first representation of the corresponding hierarchical schema.

8. A method comprising:

enabling placement, through a graphical user interface, of a first component on a form-design area, the first component representing a first data-entry field governed by a first XML schema part and the form-design area displaying an electronic form having a second component representing a second data-entry field that is an XSLT transformation of a second XML schema part;

inferring, inferring as follows:

if a location for the first component on the form-design area is beneath the second component, that the first component is subordinate to the second component;

if the location for the first component on the form-design area is within the second component, that the first component is subordinate to the second component; or if the location for the first component on the form-design area is above the second component, that the first component governs the second component;

altering a hierarchical schema governing the electronic form to include the first XML schema part corresponding to the first component, the altering as follows:

if the location for the first component on the form-design area is below the second component, subordinating the first XML schema part to the second XML schema part;

if the location for the first component on the form-design area is within the second component, subordinating the first XML schema part to the second XML schema part; or if the location for the first component on the form-design area is above the second component, subordinating the second XML schema part to the first XML schema part; and displaying, in a hierarchical schema display area, a representation of the hierarchical schema governing the electronic form, the representation showing as follows:

if the location for the first component on the form-design area is below the second component, the subordinating of the first XML schema part to the second XML schema part;

if the location for the first component on the form-design area is within the second component, the subordinating of the first XML schema part to the second XML schema part; or if the location for the first component on the form-design area is above the second component, the subordinating of the second XML schema part to the first XML schema part.

9. The method of claim 8, further comprising:

displaying, in the electronic form on the form-design area, the first data-entry field as subordinate to the second data-entry field.

10. The method of claim 8, further comprising:

displaying, in the electronic form on the form-design area, the second data-entry field as subordinate to the first data-entry field.

11. The method of claim 8, wherein the act of enabling placement comprises enabling placement of the first component within the subordination area and beneath the second component.

* * * * *

UNITED STATES PATENT AND TRADEMARK OFFICE
CERTIFICATE OF CORRECTION

| | | |
|---|---|---|
| PATENT NO. | : 8,117,552 B2 | Page 1 of 1 |
| APPLICATION NO. | : 11/567140 | |
| DATED | : February 14, 2012 | |
| INVENTOR(S) | : Paoli et al. | |

It is certified that error appears in the above-identified patent and that said Letters Patent is hereby corrected as shown below:

In the Specification,

In column 5, line 67, delete "116)" and insert -- 110) --, therefor.

In column 6, line 15, after "field 602" insert -- , --.

In column 6, line 42, delete "If;" and insert -- If, --, therefor.

In column 15, line 55, delete "1200," and insert -- 1200. --, therefor.

In column 15, line 63, after "subordinate" insert -- ( --.

In column 16, line 2, delete "210" and insert -- 1210 --, therefor.

In the Claims,

In column 19, line 16, In Claim 1, delete "component-to" and insert -- component to --, therefor.

In column 19, line 28, In Claim 1, delete "to to" and insert -- to --, therefor.

In column 20, line 12, In Claim 8, before "inferring" delete "inferring,".

Signed and Sealed this
Tenth Day of February, 2015

Michelle K. Lee
*Deputy Director of the United States Patent and Trademark Office*